United States Patent
Clawson et al.

(10) Patent No.: US 11,035,226 B2
(45) Date of Patent: Jun. 15, 2021

(54) METHOD AND SYSTEM FOR PERFORMING OPERATIONS WITH COMMUNICATIONS

(71) Applicants: Scott W. Clawson, Califon, NJ (US); Katie M. Walker, Milford, NJ (US); Mark M. Disko, Glen Gardner, NJ (US)

(72) Inventors: Scott W. Clawson, Califon, NJ (US); Katie M. Walker, Milford, NJ (US); Mark M. Disko, Glen Gardner, NJ (US)

(73) Assignee: ExxoMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/139,427

(22) Filed: Sep. 24, 2018

(65) Prior Publication Data

US 2019/0112917 A1    Apr. 18, 2019

Related U.S. Application Data

(60) Provisional application No. 62/572,147, filed on Oct. 13, 2017.

(51) Int. Cl.
| | |
|---|---|
| *E21B 47/14* | (2006.01) |
| *H04B 11/00* | (2006.01) |
| *E21B 47/12* | (2012.01) |
| *E21B 47/13* | (2012.01) |
| *G01V 1/44* | (2006.01) |
| *G01V 3/30* | (2006.01) |

(52) U.S. Cl.
CPC .............. *E21B 47/14* (2013.01); *E21B 47/12* (2013.01); *E21B 47/13* (2020.05); *G01V 1/44* (2013.01); *G01V 3/30* (2013.01); *H04B 11/00* (2013.01)

(58) Field of Classification Search
CPC ........ E21B 47/14; E21B 47/12; E21B 47/122; E21B 47/16; E21B 47/13; G01V 1/44; G01V 3/30; H04B 11/00
See application file for complete search history.

(56) References Cited

U.S. PATENT DOCUMENTS

| | | | |
|---|---|---|---|
| 3,103,643 A | 9/1963 | Kalbfell | 340/17 |
| 3,205,477 A | 9/1965 | Kalbfell | 340/18 |
| 3,512,407 A | 5/1970 | Zill | 73/152 |

(Continued)

FOREIGN PATENT DOCUMENTS

| | | | |
|---|---|---|---|
| CN | 102733799 | 6/2014 | E21B 47/16 |
| EP | 0636763 | 2/1995 | E21B 47/12 |

(Continued)

OTHER PUBLICATIONS

U.S. Appl. No. 15/666,334, filed Aug. 1, 2017, Walker, Katie M. et al.

(Continued)

*Primary Examiner* — Franklin D Balseca
(74) *Attorney, Agent, or Firm* — Leandro Arechederra, III

(57) ABSTRACT

A method and system are described for wirelessly communicating within a wellbore. The method includes constructing a communication network for a wellbore accessing a subsurface region and using the communication network in hydrocarbon operations, such as hydrocarbon exploration, hydrocarbon development, and/or hydrocarbon production.

33 Claims, 7 Drawing Sheets

(56) References Cited

U.S. PATENT DOCUMENTS

| | | | |
|---|---|---|---|
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Peterson et al. | 367/82 |
| 4,884,071 A | 11/1989 | Howard | 340/854 |
| 4,962,489 A | 10/1990 | Medlin et al. | 367/32 |
| 5,018,114 A * | 5/1991 | Mackelburg | H04B 11/00 367/134 |
| 5,124,953 A * | 6/1992 | Grosso | E21B 47/18 340/853.1 |
| 5,128,901 A | 7/1992 | Drumheller | 367/82 |
| 5,136,613 A | 8/1992 | Dumestre, III | 375/1 |
| 5,148,408 A * | 9/1992 | Matthews | E21B 47/16 367/82 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Bokhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |
| 7,426,249 B2 * | 9/2008 | Keaney | H03M 13/3961 375/265 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,595,737 B2 | 9/2009 | Fink et al. | 340/854.4 |
| 7,596,029 B2 | 9/2009 | Tingley | 367/82 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 * | 2/2012 | Camwell | E21B 47/12 340/853.2 |
| 8,117,907 B2 | 2/2012 | Han et al. | 73/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby | 166/278 |
| 8,605,548 B2 | 12/2013 | Froelich | 367/82 |

(56) References Cited

U.S. PATENT DOCUMENTS

| | | | |
|---|---|---|---|
| 8,607,864 B2 | 12/2013 | McLeod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,647,718 B2 * | 5/2017 | Seller | H04B 1/69 |
| 9,657,564 B2 | 5/2017 | Stolpman | E21B 47/16 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu et al. | G08B 21/20 |
| 9,759,062 B2 * | 9/2017 | Deffenbaugh | E21B 47/14 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/122 |
| 9,879,525 B2 | 1/2018 | Morrow et al. | E21B 47/12 |
| 9,935,709 B2 * | 4/2018 | Walton | H04B 10/1143 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 47/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 2002/0180613 A1 | 12/2002 | Shi et al. | E21B 47/18 |
| 2003/0056953 A1 | 3/2003 | Tumlin et al. | 166/298 |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0234217 A1 * | 11/2004 | Shahar | H04B 10/299 385/122 |
| 2004/0239521 A1 | 12/2004 | Zierolf | 340/854.1 |
| 2005/0269083 A1 | 12/2005 | Burris, II et al. | 166/255.2 |
| 2005/0284659 A1 | 12/2005 | Hall et al. | 175/27 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0219758 A1 | 9/2007 | Bloomfield | 702/190 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0013663 A1 | 1/2010 | Cavender et al. | 340/854.3 |
| 2010/0089141 A1 | 4/2010 | Rioufol | 73/152.28 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0188345 A1 | 8/2011 | Wang | 367/34 |
| 2011/0241897 A1 * | 10/2011 | Haynes | E21B 43/04 340/854.5 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals | 700/282 |
| 2013/0192823 A1 | 8/2013 | Barrilleaux et al. | 166/250.01 |
| 2013/0278432 A1 | 10/2013 | Shashoua et al. | 340/853.7 |
| 2013/0319102 A1 | 12/2013 | Ringgenberg et al. | 73/152.28 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm et al. | 340/854.3 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 * | 12/2015 | Morrow | E21B 47/12 367/82 |
| 2015/0377016 A1 | 12/2015 | Ahmad | E21B 47/12 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |
| 2016/0076363 A1 | 3/2016 | Morrow | E21B 47/12 |
| 2016/0109606 A1 | 4/2016 | Market et al. | G01V 1/50 |
| 2016/0215612 A1 | 7/2016 | Morrow | E21B 47/122 |

(56) References Cited

U.S. PATENT DOCUMENTS

| | | | |
|---|---|---|---|
| 2017/0138185 A1 | 5/2017 | Saed | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/35 |
| 2018/0066510 A1 | 3/2018 | Walker et al. | E21B 47/11 |
| 2018/0129692 A1* | 5/2018 | Jagtiani | G06F 16/23 |
| 2018/0139678 A1* | 5/2018 | Shashoua | E21B 47/12 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| WO | WO2002/027139 | 4/2002 | E21B 43/12 |
| WO | WO2010/074766 | 7/2010 | A41C 1/14 |
| WO | WO2013/079928 | 6/2013 | E21B 7/12 |
| WO | WO2014/018010 | 1/2014 | E21B 47/12 |
| WO | WO2014/049360 | 4/2014 | E21B 47/12 |
| WO | WO2014/100271 | 6/2014 | E21B 47/12 |
| WO | WO2014/134741 | 9/2014 | E21B 47/13 |
| WO | WO2015/117060 | 8/2015 | E21B 47/12 |

OTHER PUBLICATIONS

U.S. Appl. No. 16/139,373, filed Sep. 24, 2018, Yi, Xiaohua et al.
U.S. Appl. No. 16/139,384, filed Oct. 13, 2017, Disko, Mark M. et al.
U.S. Appl. No. 16/139,394, filed Oct. 13, 2017, Song, Limin et al.
U.S. Appl. No. 16/139,403, filed Oct. 13, 2017, Song, Limin et al.
U.S. Appl. No. 16/139,414, filed Oct. 13, 2017, Zhang, Yibing et al.
U.S. Appl. No. 16/139,421, filed Oct. 13, 2017, Song, Limin et al.
U.S. Appl. No. 16/139,427, filed Oct. 13, 2017, Disko, Mark M. et al.
U.S. Appl. No. 16/175,418, filed Oct. 30, 2018, Kent, David K. et al.
U.S. Appl. No. 62/588,067, filed Nov. 17, 2017, Song, Limin et al.
U.S. Appl. No. 62/588,080, filed Nov. 17, 2017, Kinn, Timothy F. et al.
U.S. Appl. No. 62/588,103, filed Nov. 17, 2017, Yi, Xiaohua et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data in the Indirect Dimension", pp. 8888-8909.
U.S. Department of Defense (1999) "Interoperability and Performance Standards for Medium and High Frequency Radio Systems," *MIL-STD-188-141B*, Mar. 1, 1999, 584 pages.

\* cited by examiner

METHOD AND SYSTEM FOR PERFORMING OPERATIONS WITH COMMUNICATIONS

CROSS REFERENCE TO RELATED APPLICATION

This application claims the priority benefit of U.S. Provisional Application No. 62/572,147, filed Oct. 13, 2017 entitled "Method and System for Performing Operations with Communication," the entirety of which is incorporated herein.

This application is related to U.S. Provisional Application Ser. No. 62/428,367, filed Nov. 30, 2016, entitled "Dual Transducer Communications Node for Downhole Acoustic Wireless Networks and Method Employing Same," U.S. patent application Ser. No. 15/666,292, filed Aug. 1, 2017, titled "Dual Transducer Communications Node For Downhole Acoustic Wireless Networks and Method Employing Same," U.S. Provisional Application Ser. No. 62/381,330, filed Aug. 30, 2016, entitled "Communication Networks, Relay Nodes for Communication Networks, and Methods of Transmitting Data Among a Plurality of Relay Nodes," U.S. patent application Ser. No. 15/665,931, filed Aug. 1, 2017, entitled "Communication Networks, Relay Nodes for Communication Networks, and Methods of Transmitting Data Among a Plurality of Relay Nodes," U.S. Provisional Application Ser. No. 62/428,374, filed Nov. 30, 2016, entitled "Hybrid Downhole Acoustic Wireless Network," U.S. patent application Ser. No. 15/666,299, filed Aug. 1, 2017, entitled "Hybrid Downhole Acoustic Wireless Network," U.S. Provisional Application Ser. No. 62/428,385, filed Nov. 30, 2016 entitled "Methods of Acoustically Communicating And Wells That Utilize The Methods," U.S. Provisional Application Ser. No. 62/433,491, filed Dec. 13, 2016 entitled "Methods of Acoustically Communicating And Wells That Utilize The Methods," U.S. patent application Ser. No. 15/666,324, filed Aug. 1, 2017 entitled "Methods of Acoustically Communicating and Wells that Utilize the Methods," U.S. Provisional Application Ser. No. 62/428,394, filed Nov. 30, 2016, entitled "Downhole Multiphase Flow Sensing Methods," U.S. patent application Ser. No. 15/666,328, filed Aug. 1, 2017, entitled "Downhole Multiphase Flow Sensing Methods," U.S. Provisional Application Ser. No. 62/428,425 filed Nov. 30, 2016, entitled "Acoustic Housing for Tubulars," U.S. patent application Ser. No. 15/666,334 filed Aug. 1, 2017 entitled "Acoustic Housing for Tubulars" and U.S. patent application Ser. No. 15/689,182 filed Aug. 29, 2017, entitled "Acoustic Housing for Tubulars," the disclosures of which are incorporated herein by reference in their entireties.

This application is related to U. S. Provisional Applications having common inventors and assignee and filed on an even date herewith, U.S. Provisional Application No. 62/572,146, filed Oct. 13, 2017 entitled "Method and System For Performing Operations Using Communications," (2017EMEM250), U.S. Provisional Application No. 62/572,142, filed Oct. 13, 2017 entitled "Method And System For Performing Communications Using Aliasing," (2017EM317), U.S. Provisional Application No. 62/572,147, filed Oct. 13, 2017 entitled "Method and System For Performing Operations With Communications," (2017EM251), U.S. Provisional Application No. 62/572,201, filed Oct. 13, 2017 entitled "Method And System For Performing Wireless Communications Along A Drilling String," (2017EM326), U.S. Provisional Application No. 62/572,211 filed Oct. 13, 2017 entitled "Method and System for Performing Hydrocarbon Operations With Mixed Communication Networks", (2017EM252), U.S. Provisional Application No. 62/572,201 filed Oct. 13, 2017 entitled "Dual Transducer Communications Node Including Piezo Pre-Tensioning for Acoustic Wireless Networks and Method Employing Same," (2017EM326) and U.S. Provisional Application No. 62/572,152 filed Oct. 13, 2017 entitled "Method And System For Performing Wireless Communications Along A Drilling String" the disclosures of which are incorporated herein by reference in their entireties.

FIELD OF THE INVENTION

This disclosure relates generally to the field of communicating between communication nodes for a system, which may be disposed along one or more tubular members. Specifically, the disclosure relates to methods and systems for acoustically communicating with communication nodes disposed along one or more tubular members, such as along casing or tubing within a wellbore, along a subsea conduit and/or along a pipeline, to enhance associated operations, such as hydrocarbon exploration, hydrocarbon development, hydrocarbon transport and/or hydrocarbon production. Further, the disclosure relates to methods and systems for acoustically communicating obtained measurement data by using a universal communication configuration to enhance operations, which may include hydrocarbon operations.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

The exchange of information may be used to manage the operations. By way of example, several real-time data systems or methods have been proposed in operations, such as hydrocarbon exploration, hydrocarbon development, and/or hydrocarbon production operations. In hydrocarbon exploration, development, and/or production operations, several real time data systems or methods have been proposed. As a first example, a physical connection, such as a cable, an electrical conductor or a fiber optic cable, is secured to a tubular member, which may be used to evaluate subsurface conditions. The cable may be secured to an inner portion of the conduit and/or an outer portion of the tubular member. The cable provides a hard wire connection to provide real-time transmission of data. Further, the cables may be used to provide high data transmission rates and the delivery of electrical power directly to downhole sensors. However, the use of physical cables may be difficult as the cables have to be unspooled and attached to the tubular members disposed within a wellbore. Accordingly, the conduits being installed into the well may not be rotated because of the attached cables, which may be broken through such installations. This limitation may be problematic for installations into horizontal wells, which typically involve rotating the conduits. Further, the cables have to be attached and passages have to be provided to pass the cables through the wellbore, the well head and other equipment. (e.g., openings for the cables). These passages for the cables provide potential locations for leakage of fluids, which may be more problematic for configurations that involve high pressure fluids. In addition, the leakage of down-hole fluids may increase the risk of cement seal failures.

In contrast to physical connection configurations, various wireless technologies may be used for downhole communications, which may be referred to as telemetry. The wireless technologies may include communication nodes that communicate with each other to manage the exchange of data within the wellbore and with a computer system that is utilized to manage the hydrocarbon operations. The communication nodes may involve different wireless network types. As a first example, radio transmissions may be used for wellbore communications. However, the use of radio transmissions may be impractical or unavailable in certain environments and/or during certain operations. Acoustic telemetry utilizes an acoustic wireless network to wirelessly transmit an acoustic signal, such as a vibration, via a tone transmission medium. In general, a given tone transmission medium may only permit communication within a certain frequency range; and, in some systems, this frequency range may be relatively small, such as spectrum-constrained systems.

While the downhole wireless network may be beneficial, conventional data transmission mechanisms may not be effectively utilized. The conditions within the wellbore are unknown and unpredictable, as the downhole acoustic conditions may be influenced by the formation, the cementation within the wellbore, and/or fluid compositions (e.g., gas, water and oil) within the wellbore, which vary at different locations within the wellbore. For example, the selection of the appropriate frequencies of the acoustic signals to support the predefined communication with minimum power consumption may vary with depth or other wellbore conditions. In addition, the communication exchanges may be further complicated because of changes that result from hydrocarbon operations (e.g., following fracking operations). Similar challenging conditions may be present with pipelines and subsea conduits.

Typically, wireless communication involves using predetermined settings to exchange data packets. However, the use of predetermined settings may be problematic when the environment hinders or limits the communication, which may result in one or more communication nodes being unreachable by relying on the predetermined settings. Further, the dynamic nature of the environment may cause problems if communication exchanges are interrupted. For example, a loss of communication may result in unretrievable data and/or loss of access to communication nodes (e.g., that are further downhole from the location where the communication issue exists). The loss of access to one or more communication nodes may be temporary because of changes in the environment or may be permanent as the communication node may not be reached to adjust the settings.

To address such communication problems, the predetermined settings may involve various approaches. For example, the predetermined settings may be set to perform in a manner that involves excessive energy consumption via attempts to communicate (e.g., settings that waste energy). Further, the predetermined settings may involve using exceptionally conservative settings in the communication nodes. Unfortunately, such exceptionally conservative predetermined settings tend to have negative effects on both communication speed, such as very long symbol times or applying an excessive degree of error correction, and service life, such as transmitting at excessive amplitude.

Accordingly, there remains a need in the industry for methods and systems that are more efficient and may lessen problems associated with noisy and ineffective communication in a wellbore. The present techniques provide methods and systems that overcome one or more of the deficiencies discussed above.

SUMMARY

In one embodiment, a method for communicating data among a plurality of communication nodes within a wellbore is described. The method comprising: configuring each of a plurality of communication nodes in a communication network to transmit a universal communication configuration in a portion of a data packet, wherein the universal communication configuration comprises a decoding setting that establishes a communication setting to decode one or more remaining portions of the data packet; disposing the plurality of communication nodes within a wellbore; communicating between the plurality of communication nodes within the wellbore; and performing hydrocarbon operations based on the communications between the plurality of communication nodes.

In other embodiments, the method may include various enhancements. The method may further include configuring each of the plurality of communication nodes in the communication network to receive the decoding setting from the portion of the data packet; and to decode the one or more remaining portions of the data packets based on the decoding setting; wherein two or more of the plurality of communication nodes are coupled together via a physical connection; wherein two or more of the plurality of communication nodes are configured to exchange data packets via a wireless connection; wherein each of the plurality of communication nodes may be configured to have different tone durations for the universal communication configuration portion of the data packet and the remaining portion of the data packet; wherein each of the plurality of communication nodes is configured to transmit the universal communication configuration for a tone durations less than 10 millisecond, in a range between 1 millisecond and 1 second, or in a range between 2 milliseconds and 20 milliseconds; wherein each of the plurality of communication nodes is configured to have different voltage amplitudes for the universal communication configuration portion of the data packet and the remaining portion of the data packet or each of the plurality of communication nodes is configured to transmit the universal communication configuration at a communication setting that has a voltage amplitude of two or more times the voltage amplitude of the communication setting for the one or more remaining portions of the data packet; wherein each of the plurality of communication nodes is configured to transmit the universal communication configuration at a communication setting that has a voltage amplitude of four or more times the voltage amplitude of the communication setting for the one or more remaining portions of the data packet; wherein each of the plurality of communication nodes is configured to have different tone amplitudes for the universal communication configuration portion of the data packet and the remaining portion of the data packet; wherein each of the plurality of communication nodes is configured to transmit the universal communication configuration at a communication setting that has a tone amplitude of two or more times the tone amplitude of the communication setting for the one or more remaining portions of the data packet; wherein each of the plurality of communication nodes is configured to transmit the universal communication configuration at a communication setting that has a tone amplitude of four or more times the tone amplitude of the communication setting for the one or more remaining portions of the data packet; wherein each of the plurality of communication nodes is configured to have different symbol times for the universal communication configuration portion of the data packet and the remaining portion of the data packet; wherein each of the plurality of communication nodes is configured to transmit the universal communication configuration at a communication setting that has a symbol time at least two milliseconds greater than the symbol time of the communication setting for the one or more subsequent portions of the data packet; wherein each of the plurality of communication nodes is configured to transmit the universal communication configuration at a communication setting that has a symbol time at least 10% greater than the symbol time of the communication setting for the one or more subsequent portions of the data packet; wherein the universal communication configuration portion of the data packet is an initial portion of data packet; wherein the universal communication configuration further comprises an error correction setting for detecting any errors in the data packet; may further comprise: determining a universal communication configuration, obtaining well data for a subsurface region, and creating a communication network based on the well data; wherein the communication network comprises the plurality of communication nodes disposed within the wellbore; wherein the communicating between the plurality of communication nodes within the wellbore to perform hydrocarbon operations comprises exchanging low-frequency signals are less than or equal to ($\leq$) 20 kilohertz or in the range between 100 hertz and 20 kilohertz; wherein the communicating between the plurality of communication nodes within the wellbore to perform hydrocarbon operations comprises exchanging high-frequency signals that are greater than ($>$) 20 kilohertz or in the range between greater than 20 kilohertz and 1 megahertz; wherein a first set of the plurality of communication nodes are disposed in unmonitored sections of the wellbore and a second set of the plurality of communication nodes are disposed in monitored sections of the wellbore; may further comprise: i) monitoring the wireless network for an event, ii) modifying the settings in one or more of the plurality of communication nodes if an event is detected, and iii) continuing the communicating between the plurality of communication nodes within the wellbore to perform hydrocarbon operations if an event is not detected, and iv) repeating steps i) to iii) until the hydrocarbon operations are complete; wherein the event is a failure of the wireless network to operate properly within the wellbore; and/or wherein the event is detection of a change in an acoustic environment within the wellbore.

BRIEF DESCRIPTION OF THE DRAWINGS

The advantages of the present invention are better understood by referring to the following detailed description and the attached drawings.

DETAILED DESCRIPTION

Figure 1:
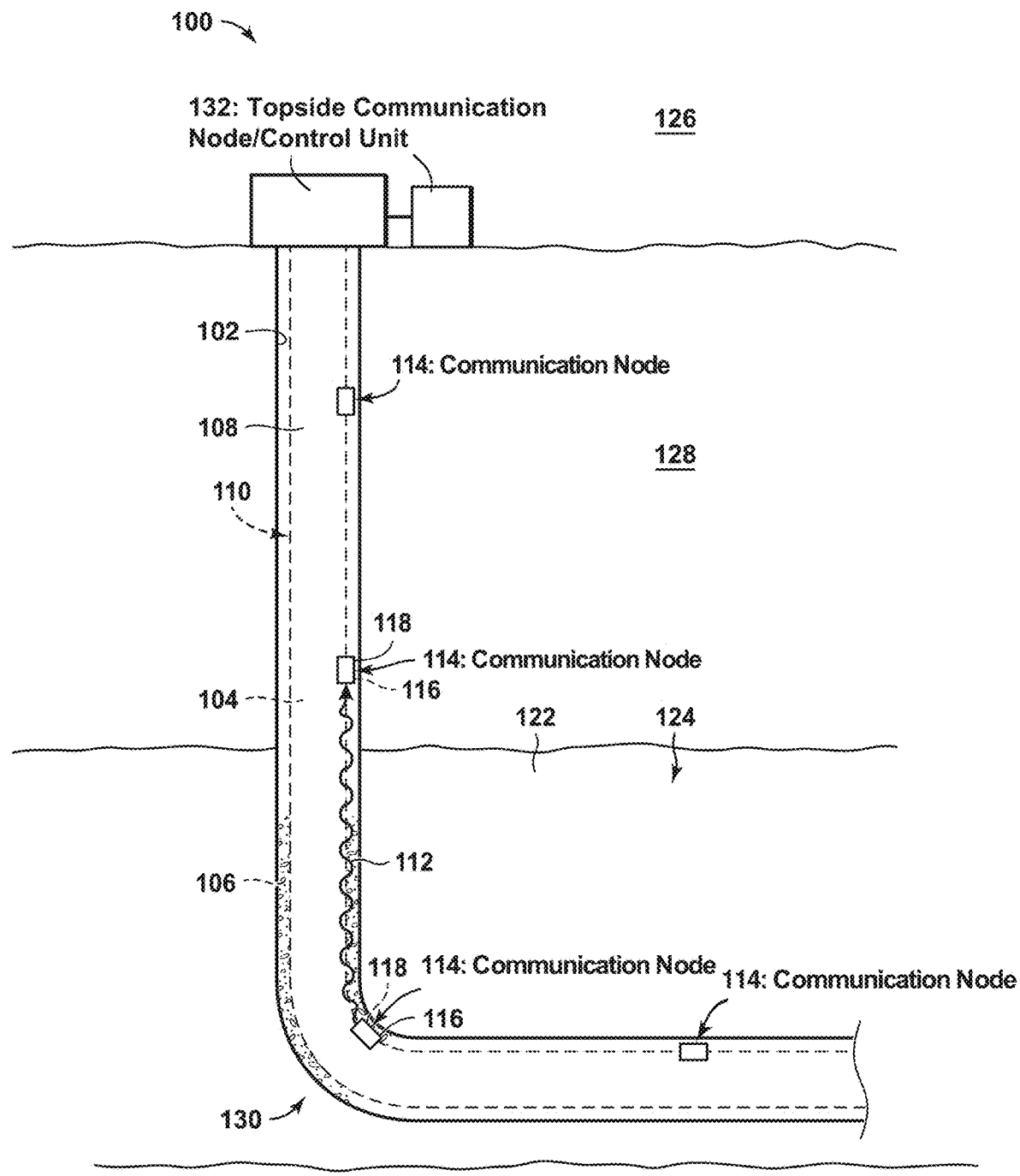
FIG. 1 is a schematic representation of a well configured to utilize the methods according to the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

The directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

As used herein, the term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "any" means one, some, or all indiscriminately of whatever quantity.

As used herein, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "based on" does not mean "based only on", unless expressly specified otherwise. In other words, the phrase "based on" describes both "based only on," "based at least on," and "based at least in part on."

As used herein, "conduit" refers to a tubular member forming a physical channel through which something is conveyed. The conduit may include one or more of a pipe, a manifold, a tube or the like, or the liquid contained in the tubular member. Alternately, conduit refers to an acoustic channel of liquid which may, for example, exist between the formation and a tubular.

As used herein, "couple" refers to an interaction between elements and is not meant to limit the interaction to direct interaction between the elements and may also include indirect interaction between the elements described. Couple may include other terms, such as "connect", "engage", "attach", or any other suitable terms.

As used herein, "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

As used herein, "event" is used herein to mean a failure to operate properly; and/or a detection of a change in an acoustic environment. The failure to operate properly may be based on the detection of a local failure; detection of a change in the acoustic environment; detection of a manual trigger and/or detection of a time based period.

As used herein, "exemplary" is used exclusively herein to mean "serving as an example, instance, or illustration." Any embodiment described herein as "exemplary" is not necessarily to be construed as preferred or advantageous over other embodiments.

As used herein, "formation" refers to any definable subsurface region. The formation may contain one or more hydrocarbon-containing layers, one or more non-hydrocarbon containing layers, an overburden, and/or an underburden of any geologic formation.

As used herein, "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like. The hydrocarbon exploration activities may include drilling exploratory wells.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° Celsius (C) and 1 atmospheric (atm) pressure). Hydrocarbon fluids may include, for example, oil, natural gas, gas condensates, coal bed methane, shale oil, shale gas, and other hydrocarbons that are in a gaseous or liquid state.

As used herein, "hydrocarbon operations" refers to any activity associated with hydrocarbon exploration, hydrocarbon development, collection of wellbore data, and/or hydrocarbon production. It may also include the midstream pipelines and storage tanks, or the downstream refinery and distribution operations.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments.

As used herein, "monitored section" and "monitored sections" refer to locations along the tubular members that include sensors and/or are regions of interest.

As used herein, "unmonitored section" and "unmonitored sections" refer to locations along the tubular members that do not include sensors and/or are not regions of interest.

As used herein, "operatively connected" and/or "operatively coupled" means directly or indirectly connected for transmitting or conducting information, force, energy, or matter.

As used herein, "optimal", "optimizing", "optimize", "optimality", "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

As used herein, "potting" refers to the encapsulation of electrical components with epoxy, elastomeric, silicone, or asphaltic or similar compounds for the purpose of excluding moisture or vapors. Potted components may or may not be hermetically sealed.

As used herein, "range" or "ranges", such as concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, "stream" refers to fluid (e.g., solids, liquid and/or gas) being conducted through various regions, such as equipment and/or a formation. The equipment may include conduits, vessels, manifolds, units or other suitable devices.

As used herein, "subsurface" refers to geologic strata occurring below the earth's surface.

As used herein, "tubular member", "tubular section" or "tubular body" refer to any pipe, such as a joint of casing, a portion of a liner, a drill string, a production tubing, an injection tubing, a pup joint, a buried pipeline, underwater piping, walls of a vessel, or above-ground piping. Solid lines therein, and any suitable number of such structures and/or features may be omitted from a given embodiment without departing from the scope of the present disclosure.

As used herein, "wellbore" or "downhole" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

As used herein, "zone", "region", "container", or "compartment" is a defined space, area, or volume contained in the framework or model, which may be bounded by one or more objects or a polygon encompassing an area or volume of interest. The volume may include similar properties.

As used herein, "well data" may include seismic data, electromagnetic data, resistivity data, gravity data, well log data, core sample data, and combinations thereof. The well data may be obtained from memory or from the equipment in the wellbore. The well data may also include the data associated with the equipment installed within the wellbore and the configuration of the wellbore equipment. For example, the well data may include the composition of the tubular members, thickness of the tubular members, length of the tubular members, fluid composition within the wellbore, formation properties, cementation within the wellbore and/or other suitable properties associated with the wellbore.

The exchange of information may be used to manage the operations for different technologies. By way of example, the communication network may include communication nodes associated with a system, which may be disposed along a wave propagation channel, acoustic channel, a communication medium, and/or along one or more tubular members. For example, the communication nodes may be distributed along casing or tubing within a wellbore, along a subsea conduit and/or along a pipeline, to enhance associated operations for the system. To exchange information, the communication network may include physically connected communication nodes, wirelessly connected communication nodes or a combination of physically connected communication nodes and wirelessly connected communication nodes.

By way of example, the communication network may be used for data exchanges of operational data, which may be used for real-time or concurrent operations involving hydrocarbon exploration operations, hydrocarbon development operations, and/or hydrocarbon production operations, for example. In hydrocarbon operations, the system or method may involve communicating (e.g., via a physical connection, such as a cable, an electrical conductor or a fiber optic cable, and/or via an acoustic wireless network) through various communication nodes, which may be spaced-apart along a length of tubular members, (e.g., a tone transmission medium, such as conduits or conduit sections). These communication nodes may be formed into a communication network and may be configured to exchange signals with each other to manage the exchange of data packets within the wellbore and with a computer system that is utilized to manage the hydrocarbon operations. By way of example, the communication nodes may involve communicating via one or more frequencies of acoustic tones, which may be transmitted and/or received via a physical connection or a tone transmission medium.

In certain configurations, the communication nodes may include a housing that isolates various components within an interior region from the wellbore environment. In particular, the communication nodes may include one or more encoding components, which may be configured to generate and/or to induce one or more acoustic tones within tone transmission medium, such as a tubular member or liquid inside the tubular member or liquid existing between the subsurface formation and a tubular, or within a physical connection. In addition, the communication nodes may include one or more decoding components, which may be configured to receive and/or decode acoustic tones from the tone transmission medium or physical connection, which may be based on communication settings. The communication nodes may include one or more power supplies configured to supply energy to the other components, such as batteries. The communication nodes may include one or more sensors or sensing components, which may be configured to obtain measurement data associated with the downhole environment and/or the subsurface formation. The communication nodes may include relatively small transducers to lessen the size of the communication nodes, such that the communication nodes may be disposed or secured to locations having limited clearance, such as between successive layers of downhole tubular members. As an example, small acoustic transducers may be configured to transmit and/or receive tones. The smaller transducers have higher acoustic resonant frequencies compared to larger transducers and thus use less energy to send acoustic signals around the resonant frequency band as compared with the larger transducers around their respective resonant frequency bands. By way of example, the transducer may transmit out high frequency signals consuming less power due to the small size transducer's intrinsic resonant frequency being high, while the transducer may receive the same high frequency acoustic signals. The aliasing occurs at the microcontroller level, such that the receiving transducer may be the same size as the transmitting transducer, if it is not the same transducer. A benefit from using a small transmitting transducer and receiving transducer, is that small factor transducers enable a compact communication node.

Downhole communication may be beneficial for enhancing hydrocarbon operations, such as optimizing drilling, optimizing or managing completions, and performing well management. The present techniques include enhancements that manage the communication on a communication network, which is a universal communication configuration. The signals (e.g., acoustic signals) used by the communication nodes may be the same or different among pairs of communication nodes in the system. Further, the communication nodes in a communication network may use the universal communication configuration in a portion of a data packet (e.g., at an initial portion of the data packet), which includes decoding settings that provide the communication settings and/or represent the proper communication settings, to decode the remaining portions of the data packet. The communication settings, which are included in or represented by the decoding settings, may include different modulation schemes, voltage amplitudes, frequency bands, number of tones in the frequency bands, number of frequencies to concurrently transmit, transmission durations, ranges of transmission amplitudes, transmission windows, type of error corrections, degrees of spread spectrum diversity, detection thresholds, symbol times, physical to logical symbol mappings, and other settings. The universal communication configuration, which may be a portion of the data packet, such as an initial sequence in the data packet, establishes communication settings for a receiving communication node.

Even after the communication is established between communication nodes, the dynamic nature of the downhole environment may result in the communication settings becoming unworkable. As a result, the communication nodes may have to adjust or modify the communication settings to updated communication settings, which may differ from the previous communication settings. While some approaches use exceptionally conservative settings for all of the communication exchanges, the use of exceptionally conservative settings for extended periods of time may have negative effects on both communication speed and operational life of the communication nodes via higher energy use. Another approach may involve later switching to more optimized communication settings with later exchange of data packets, but this approach exposes the established communication between the communication nodes to risk in the dynamic downhole environment.

In addition, a network channel within a wellbore may operate as a shared communications medium and does not support multiple concurrent conversations among communication nodes in the same region of the network channel. By way of example, an acoustic wireless network channel within a well, such as a production well or an injection well, may operate as a shared communications medium and does not support simultaneous two-way communication between a pair of communication nodes or may involve two distinct pairs of communication nodes such that the transmitter for each pair sends the respective data packet at the same moment, in the same locality. Accordingly, performing multiple concurrent conversations may involve each conversation using different settings, such as distinct frequency bands or different symbol times, and may complicate network operations. These complications may be more influenced by noise and may increase the risk of loss of data and communication nodes from a severed network.

Contrary to conventional network communications, the present techniques utilize a universal communication configuration to enhance the downhole communications for hydrocarbon operations. In particular, the present techniques provide a method for acoustically communicating between communication nodes, which uses exceptionally conservative settings in a portion of the data packet and then provides the remaining portion of the data packet in a more optimal communication setting. The exceptionally conservative settings may be settings that are determined to be the maximum communication setting for a parameter, such as the highest voltage amplitude or tone amplitude, or the longest symbol time. The exceptionally conservative settings are designed to maximize the potential for the communication to be successfully received by the neighboring communication nodes. By using a universal communication configuration, the present techniques may lessen communication failure events by providing the decoding communication settings with the exceptionally conservative settings, and then providing measurement data or other information with more optimal communication settings to enhance performance of the communication nodes. In particular, the universal communication configuration provides the flexibility to change the communication settings for each data packet based on the decoding settings in a portion of the data packet. Thus, the communication nodes that exchange data packets may use the same or different decoding communication settings to provide the measurement data or other information. In one embodiment, a single communication may use two or more universal communication configurations and provide two or more measurements or other information. Specifically, the universal communication configuration may include transmitting a decoding sequence (e.g., minimal sequence that may include error correction information and/or the decoding settings that may be used to decode the remaining portions or sequences in the data packet). In a preferred configuration, the initial or first sequence is based on the extraordinarily conservative settings at the beginning to establish communication between the respective communication node pairs. The decoding communication settings, which may be a first sequence or initial sequence, may be used by the receiving communication node to decode the remaining sequences in the data packet. Accordingly, the universal communication configuration may be unique and individually selected for each data packet.

The present techniques provide various enhancements that provide flexibility in operating the communication network in environments that are variable or unstable, such as in a pipeline, in a downhole environment, or in a subsea conduit. For example, the present techniques may be configured to utilize variable symbol times. By providing the decoding setting, the present techniques provides flexibility in optimizing performance in unstable and variable environment. That is, the environment changes and the flexibility in the universal communication configuration is able to adapt to such change dynamically.

Beneficially, the present techniques use of the universal communication configurations provide various enhancements. The present techniques provide flexibility with symbol timing in contrast to conventional network communications, which involve fixed time slots or fixed symbol time. Time slots are typically utilized in synchronous timing in communications, while symbol timing is utilized with asynchronous timing in communications. The variability or flexibility in the symbol times may be between different data packets or within a single data packet. For example, the universal communication configuration may be provided with a first symbol time, while the remaining portions of the data packet may be provided with a second symbol time, which is different from the first symbol time. Further, the universal communication configuration provides the decoding setting with each data packet from the transmitting communication node that establishes the communication settings to decode the remaining portions of the data packets, which does not employ training, negotiating, and/or other data packet exchanges with the receiving communication node to determine the preferred communication setting. Further, the universal communication configuration may be utilized for physical connections and/or wireless connections.

By way of example, a first communication node (e.g., a transmitting communication node) may transmit a data packet that includes a universal communication configuration having a decoding setting and then the remaining encoded data. The universal communication configuration may be transmitted at higher or more conservative communication setting, such as extraordinary conservative settings, than the remaining encoded data. The transmitted data packet may be provided to a second communication node (e.g., a receiving communication node). The decoding setting is configured to provide sufficient information to determine the communication settings to decode further data provided within the data packet (e.g., the optimized communication settings that are more efficient than the decoding setting sequence that is used for the universal communication configuration). The second communication node may be configured to receive the decoding setting, which may be preferably in an initial interval or portion of the data packet, and to adjust the communication settings of the second communication node for the remaining portions or sequences of the data packet based on the information included in the received decoding setting. The information in the decoding setting interval or sequence of the universal communication configuration may include parameter settings for symbol times (e.g., fixed symbol times and/or variable symbol times), voltage amplitudes and/or tone amplitudes, for example. The communication settings used for the universal communication configuration and used for the other portions of the data packet may include different communication setting parameters. For example, one configuration may include a short initial sequence (e.g., decoding setting sequence provided in an initial interval) with a long sequence (e.g., encoded sequence or optimized sequence provided in subsequent portions of the data packet) of information transmitted at the communication settings indicated in the decoding setting, resulting in performance that is more efficient and involves significantly lessened risk of failure relative to communications relying on preset communication settings. The decoding setting may be varied or defined differently based on the specific objective for the downhole communications, which may include highest data rate, lowest initial latency, lowest energy expenditure, longest telemetry range, greatest potential for simultaneous conversations, highest real-time availability, shortest excess time awake, and other suitable objectives.

Beneficially, the use of universal communication configuration provides various enhancements. For example, the universal communication configuration provides a dynamic mechanism that dynamically changes communication settings based on a decoding setting in a data packet, which has does not involve relying on pre-arranged communication settings. As a result, the universal communication configuration involves the sender (e.g., transmitting communication node) providing the communication setting to decode the data packet being transmitted. Thus, the present techniques provide diminished risk of communication issues, lessened management complexity, more efficient network optimization, and/or simultaneous communication on multiple channels. In particular, the universal communication configuration also provides a mechanism to perform simultaneous conversations between the communication nodes within a communication network. Further, the universal communication configuration provides a flexible system that may adjust each data packet to provide different settings to decode the respective data packet. In addition, the universal communication configuration provides a mechanism for manual or automatic reconfiguration of universal configuration settings. For example, a packet with multiple universal communication configuration sections may be configured to repeat data several times, while changing one or more parameters between the most aggressive to least aggressive. Moreover, the universal communication configuration may be positioned in an initial portion of data packet, in the body portion of the data packet or at the end portion of the data packet. Also, the data packet may include two or more universal communication configurations.

By way of example, the universal communication configuration may include different configurations, such as location in the data packet, size or other variations. For example, each communication node may be configured to have different tone durations for the universal communication configuration portion of the data packet and the remaining portion of the data packet. In particular, each communication node may be configured to transmit the universal communication configuration for a tone duration less than 1 millisecond, less than 10 milliseconds, less than 20 milliseconds, less than 100 milliseconds or less than 1 second. Alternatively, the tone duration may be in a range between 1 millisecond and 1 second, in a range between 2 milliseconds and 500 milliseconds, in a range between 2 milliseconds and 200 milliseconds, in a range between 2 milliseconds and 50 milliseconds, or in a range between 2 milliseconds and 20 milliseconds. Further, each communication node may be configured to have different voltage amplitudes for the universal communication configuration portion of the data packet and the remaining portion of the data packet. For example, each communication node may be configured to transmit the universal communication configuration at a communication setting that has a voltage amplitude of two or more times the voltage amplitude of the communication setting for the one or more remaining portions of the data packet; and/or the universal communication configuration at a communication setting that has four or more times the voltage amplitude of the communication setting for the one or more remaining portions of the data packet. Moreover, each communication node may be configured to have different tone amplitudes for the universal communication configuration portion of the data packet and the remaining portion of the data packet. For example, the communication node may be configured to transmit the universal communication configuration at a communication setting that has a tone amplitude of two or more times the tone amplitude of the communication setting for the one or more remaining portions of the data packet and/or the universal communication configuration at a communication setting that has a tone amplitude of four or more times the tone amplitude of the communication setting for the one or more remaining portions of the data packet. The universal communication configuration may further comprise an error correction setting for detecting any errors for the data packet. Further still, each communication node may be configured to have different symbol times for the universal communication configuration portion of the data packet and the remaining portion of the data packet. For example, the communication node may be configured to transmit the universal communication configuration at a communication setting that has a symbol time of two or more times the symbol time of the communication setting for the one or more remaining portions of the data packet; the universal communication configuration at a communication setting that has a symbol time of at least two milliseconds greater than the symbol time of the communication setting for the one or more remaining portions of the data packet; the universal communication configuration at a communication setting that has a symbol time of at least four milliseconds greater than the symbol time of the communication setting for the one or more remaining portions of the data packet; the universal communication configuration at a communication setting that has a symbol time at least 10% greater than the symbol time of the communication setting for the one or more subsequent portions of the data packet; the universal communication configuration at a communication setting that has a symbol time at least 20% greater than the symbol time of the communication setting for the one or more subsequent portions of the data packet and/or the universal communication configuration at a communication setting that has a symbol time of four or more times the symbol time of the communication setting for the one or more remaining portions of the data packet.

The present techniques address certain deficiencies with downhole communications by blending the optimized performance with reduced risk in acoustic communications. One enhancement is that the communication nodes do not have to pre-arrange a common set of communication settings, which may be inefficient. Also, the present techniques provide the ability to switch to updated communication settings without disrupting the in-progress communication (e.g., change the communication settings during the conversation or communication session or in the middle of a data packet). The present techniques may also provide the ability to change communication settings for each successive data packet, within the same data packet and/or may provide the ability to change communication settings multiple times in a single data packet. Also, the present techniques may provide the ability for multiple communication nodes to bind transmission fragments of disparate communication settings into a single collective communication session.

In certain configurations, multiple communication nodes may operate together to generate a single communication conversation that includes transmission fragments contributed by each communication node, regardless of disparate communication settings. For example, the present techniques may combine telemetry with diagnostic or sensing-specific tones, fountain-style streaming forward error correction, optional expanded band utilization, multi-target device synchronization, conversation accessibility for legacy devices with disjoint communication ability, and more.

In yet another configuration, the communication nodes may be used to communicate with other communication devices, such as low-frequency devices. By way of example, the communication nodes may utilize the universal communication configuration to set low-frequency effective clock speeds that are utilized to communicate with low-frequency devices, such as a hydrophone. The hydrophones may be configured to operate with low-frequency signals and/or high-frequency signals, which may be used to communicate with the communication nodes. The low-frequency device may be utilized to exchange data or instructions to the communication nodes. This configuration may be used to reach or communicate with communication nodes that may provide longer range communications than conventionally utilized within the wellbore. As a specific example, the communication nodes may be configured to receive communication signals from a communication device, such as a hydrophone or a designated communication node, transmitting in a lower frequency band (e.g., to provide longer range communications) without involving reconfiguration of any network devices, such as the communication nodes. In particular, the downhole network may be configured to receive and/or to transmit frequencies less than 200 kHz, less than 100 kHz, or preferably less than 50 kHz. The use of the lower frequencies extends the distance that the lower-frequency communication nodes may be spaced apart from each other and maintain the exchange of data packets. As a specific example, certain communication nodes may be configured to receive signals at frequencies less than 15 kHz. These low-frequency communication nodes may be disposed within different zones of the wellbore, which may be utilized within the respective zones to lessen the risk of becoming separated or losing a portion of the downhole network. The communication nodes that operate at these lower frequencies may be configured to receive longer range signals as compared with communication nodes operating at higher frequencies. As a result, the lower-frequency communication nodes may be reachable, while the higher-frequency communication nodes may not be able to communicate in certain zones of the wellbore. Similarly, the communication nodes may be configured to receive communication signals from a communication device, such as a pig within a pipeline or subsea conduit, transmitting in a lower frequency band (e.g., to provide longer range communications) without involving reconfiguration of any network devices, such as the communication nodes. The pig, which may be used to clean the interior of the pipeline, may be moved within the pipeline and configured to communicate with the various communication nodes associated with the pipeline. The pig may utilize the universal communication configuration to establish communication with the communication nodes.

In addition to the above, the universal communication configuration may also facilitate multiple simultaneous conversations in each locality by simplifying management of distinct sets of communication settings because the universal communication configuration provides each transmitting communication node pair the ability to vary communication settings on an arbitrary basis. Further, in such a configuration, any given sender (e.g., transmitting communication node) may initiate a conversation with another device regardless of current activity in the same locality, by varying communication settings randomly within given limits known to operate properly. Such multiple conversations or communication sessions may tend to succeed in proportion with the probability that two communication nodes in the same locality may transmit decoding setting that do not interfere with each other (e.g., because the decoding setting specific to a node pair uses the same communication settings for the remainder of the data packet, with new communication settings taking effect immediately after the universal communication configuration). If two communication sessions in the same locality begin at nearly the same time such that their universal communication configuration portions occur in overlapping fashion, there is a high probability that neither communication session may operation properly.

By way of example, a system may include four communication nodes, such as a first node, a second node, a third node, and a fourth node. The communication network may include first communication node and a third communication node that are conversing, and the second communication node and the fourth communication node that are conversing. This configuration may operate properly as long as the conversation of the first and third communication nodes and the conversation of the second and fourth communication nodes satisfy certain conditions: (i) the respective conversations of the first and third communication nodes and the second and fourth communication nodes are using different decode settings; and (ii) the decode setting tones for first and third communication nodes and for the two and fourth communication nodes do not interfere with each other. The decoding setting tones themselves may be transmitted using the same exceptionally conservative settings, so they can interfere with each other even if the remainder of the data packets in the respective conversations are using different settings from each other.

In one or more embodiments, the communication network may be a wireless communication network may include different types of wireless communication types. The wireless communication networks may include high-frequency communication nodes and/or low-frequency communication nodes. By way of example, the present techniques may include a configuration that utilizes communication nodes that are low-frequency communication nodes and/or high-frequency communication nodes. These different communication nodes may be distributed within the wellbore to provide enhancements for the hydrocarbon operations. The communication nodes may include using low-frequency communication nodes at locations that do not involve sensing (e.g., in an uncompleted vertical section). The low-frequency communication nodes may involve a low-frequency ranges, which may be utilized for optimal performance with low system complexity. The high-frequency communication nodes may be used for locations that involve sensing (e.g., near completions or zones of interest). The high-frequency communication nodes may involve a higher frequencies as compared to a low-frequencies used by the low-frequency communication nodes.

As a further example, the communication nodes may include low-frequency communication nodes; high-frequency communication nodes; communication nodes configured to communicate with high-frequencies and low-frequencies signals and communication nodes that are configured to communicate with low and/or high frequency radio frequencies (RF). The low-frequency communication nodes may be configured to transmit signals and to receive signals that are less than or equal to (≤) 200 kHz, ≤100 kHz, ≤50 kHz, or ≤20 kHz. In particular, the low-frequency communication nodes may be configured to exchange signals in the range between 100 Hz and 20 kHz; in the range between 1 kHz and 20 kHz; and in the range between 5 kHz and 20 kHz. Other configurations may include low-frequency communication nodes, which may be configured to exchange signals in the range between 100 Hz and 200 kHz; in the range between 100 Hz and 100 kHz; in the range between 1 kHz and 200 kHz; in the range between 1 kHz and 100 kHz; in the range between 5 kHz and 100 kHz and in the range between 5 kHz and 200 kHz. The communication nodes may also include high-frequency communication nodes configured to transmit and receive signals that are greater than (>) 20 kHz, >50 kHz, >100 kHz or >200 kHz. Also, the high-frequency communication nodes may be configured to exchange signals in the range between greater than 20 kHz and 1 MHz, in the range between greater than 20 kHz and 750 kHz, in the range between greater than 20 kHz and 500 kHz. Other configurations may include high-frequency communication nodes, which may be configured to exchange signals in the range between greater than 100 kHz and 1 MHz; in the range between greater than 200 kHz and 1 MHz; in the range between greater than 100 kHz and 750 kHz; in the range between greater than 200 kHz and 750 kHz; in the range between greater than 100 kHz and 500 kHz; and in the range between greater than 200 kHz and 500 kHz.

In one or more configurations, the communication network may include a physical connection network. The physical connections may include one or more cables, one or more electrical conductors and/or one or more fiber optic cables, which may be secured to a tubular member and used to evaluate subsurface conditions. The physical connection may be secured to an inner portion of the tubular member and/or an outer portion of the tubular member. The physical connection provides a hard wire connection that may provide concurrent or real-time exchange of data packets within the wellbore. In addition, the physical connection may be used to provide power directly to communication nodes and/or downhole sensors.

In other configurations, as physical cables may be difficult to deploy into the wellbore, the communication network may include a combination of one or more wireless networks with one or more physical connection networks. In such a configuration, the physical connection network of communication nodes may be disposed at locations that do not involve sensing (e.g., in an uncompleted vertical section), while the wireless network of communication nodes may be disposed at locations in horizontal sections of the wellbore or sections that involve sensing (e.g., monitored sections of the wellbore). Another configuration may include using wireless network of communication nodes for long range communications, while the wired physical connections network of communication nodes may be used for monitored sections of the wellbore to handle the high speed data transmissions within those sections.

Also, the communication nodes may include an ultrasonic acoustic communication network and may involve using different detection techniques, such as multiple frequency shift keying (MFSK). In MFSK, reliable detection and decoding of the acoustic signal frequencies is the basis for this type of communication. As noted above, the unknown and unpredictable downhole acoustic conditions may be defined from the formation, cementation, and/or composition (e.g., gas, water and/or oil). Accordingly, it may be difficult to select the frequencies for acoustic signals to be utilized between the communication nodes prior to deployment within the wellbore to support a desired communication (e.g., long range communication or a short range communication) with minimum power consumption.

In addition, as another enhancement, the frequency ranges may be adjusted. In particular, the acoustic communication channel between each pair of communication nodes may be variable over a small frequency range. The frequency selectivity is a result of the coupling of acoustic signals to the tubular members from individual communication nodes, which may be influenced by the installation, but also may be influenced by conditions, such as the acoustic signal propagation path variations along the wellbore (e.g., formation, cement, casing, and/or composition of gas, water, and oil). As a further influence, the coupling and propagation of an acoustic signal may be disrupted after performing hydrocarbon operations (e.g., after fracking in unconventional wells). As a result, selecting one pre-selected set of acoustic frequencies for the entire communication system is not likely to be useful.

In other configurations, the communication network may be re-evaluated whenever an event is detected (e.g., the universal communication configuration may be modified). An event may be detected when the network fails to operate properly. The failure to operate properly may be based on the detection of a local failure; detection of a change in the acoustic environment; detection of a manual trigger and/or detection of a time based period. By way of example, a local failure may be determined if two communication nodes do not communicate with each other after a certain number of attempts (e.g., three failed attempts to communicate and/or five or more failed attempts to communicate). Further, a full system re-evaluation may be detected based on a change in the acoustic environment (e.g., cement, production, injection, and/or fracking). The detection of the acoustic environment changes may involve detecting the environment, determining a change in the environment (e.g., comparing the detected environment with a specific threshold to determine if the change is above the specific threshold). Also, the detection of a manual trigger may be based on a notification transmitted in the system (e.g., a signal from a control unit or top communication node). The detection of a time based period may include determining whether a time period has expired (e.g., time period of 30 minutes, one hour and/or two hours). This detection of a time based period may be performed autonomously. If a failure is detected, the universal communication configuration may be performed to establish different settings.

In yet other configurations, the communication nodes may use the universal communication configuration to exchange data packets to perform hydrocarbon operations. By way of example, the hydrocarbon operations may include managing the drilling within the wellbore, managing a multizone completion operation, managing the production operations within the wellbore and the like.

In other configurations, the high-frequency communication nodes may include two or more types of communication nodes, which may be used for different purposes. By way of example, the high-frequency communication nodes may include sensing capabilities for use in sections where data should be measured and collected. In other configurations, the communication nodes may not include sensing capabilities, which may not include sensing capabilities for cost optimization, but may focus on communication capabilities. The communication nodes may be optimized separately based on its primary functionality.

Accordingly, the present techniques may enhance the hydrocarbon operations through the use specific configuration of communication nodes in a communication network. For example, in one or more embodiments, a method for communicating data among a plurality of communication nodes within a wellbore is described. The method comprising: configuring each of a plurality of communication nodes in a communication network to transmit a universal communication configuration in a portion of a data packet, wherein the universal communication configuration comprises an decoding setting that establishes a communication setting to decode one or more remaining portions of the data packet; disposing the plurality of communication nodes within a wellbore; communicating between the plurality of communication nodes within the wellbore; and performing hydrocarbon operations based on the communications between the plurality of communication nodes.

In other embodiments, the method may include various enhancements. The method may further include configuring each of the plurality of communication nodes in the communication network to receive the decoding setting from the portion of the data packet; and to decode the one or more remaining portions of the data packets based on the decoding setting; wherein two or more of the plurality of communication nodes are coupled together via a physical connection; wherein two or more of the plurality of communication nodes are configured to exchange data packets via a wireless connection; wherein each of the plurality of communication nodes may be configured to have different tone durations for the universal communication configuration portion of the data packet and the remaining portion of the data packet; wherein each of the plurality of communication nodes is configured to transmit the universal communication configuration for a tone duration less than 10 millisecond, in a range between 1 millisecond and 1 second, or in a range between 2 milliseconds and 20 milliseconds; wherein each of the plurality of communication nodes is configured to have different voltage amplitudes for the universal communication configuration portion of the data packet and the remaining portion of the data packet or each of the plurality of communication nodes is configured to transmit the universal communication configuration at a communication setting that has a voltage amplitude of two or more times the voltage amplitude of the communication setting for the one or more remaining portions of the data packet; wherein each of the plurality of communication nodes is configured to transmit the universal communication configuration at a communication setting that has a voltage amplitude of four or more times the voltage amplitude of the communication setting for the one or more remaining portions of the data packet; wherein each of the plurality of communication nodes is configured to have different tone amplitudes for the universal communication configuration portion of the data packet and the remaining portion of the data packet; wherein each of the plurality of communication nodes is configured to transmit the universal communication configuration at a communication setting that has a tone amplitude of two or more times the tone amplitude of the communication setting for the one or more remaining portions of the data packet; wherein each of the plurality of communication nodes is configured to transmit the universal communication configuration at a communication setting that has a tone amplitude of four or more times the tone amplitude of the communication setting for the one or more remaining portions of the data packet; wherein each of the plurality of communication nodes is configured to have different symbol times for the universal communication configuration portion of the data packet and the remaining portion of the data packet; wherein each of the plurality of communication nodes is configured to transmit the universal communication configuration at a communication setting that has a symbol time at least two milliseconds greater than the symbol time of the communication setting for the one or more subsequent portions of the data packet; wherein each of the plurality of communication nodes is configured to transmit the universal communication configuration at a communication setting that has a symbol time at least 10% greater than the symbol time of the communication setting for the one or more subsequent portions of the data packet; wherein the portion of the data packet is an initial portion of data packet; wherein the universal communication configuration further comprises an error correction setting for detecting any errors in the data packet; may further comprise: determining a universal communication configuration, obtaining well data for a subsurface region, and creating a communication network based on the well data; wherein the communication network comprises the plurality of communication nodes disposed within the wellbore; wherein the communicating between the plurality of communication nodes within the wellbore to perform hydrocarbon operations comprises exchanging low-frequency signals are less than or equal to ($\leq$) 20 kilohertz or in the range between 100 hertz and 20 kilohertz; wherein the communicating between the plurality of communication nodes within the wellbore to perform hydrocarbon operations comprises exchanging high-frequency signals that are greater than ($>$) 20 kilohertz or in the range between greater than 20 kilohertz and 1 megahertz; wherein a first set of the plurality of communication nodes are disposed in unmonitored sections of the wellbore and a second set of the plurality of communication nodes are disposed in monitored sections of the wellbore; may further comprise: i) monitoring the wireless network for an event, ii) modifying the settings in one or more of the plurality of communication nodes if an event is detected, and iii) continuing the communicating between the plurality of communication nodes within the wellbore to perform hydrocarbon operations if an event is not detected, and iv) repeating steps i) to iii) until the hydrocarbon operations are complete; wherein the event is a failure of the wireless network to operate properly within the wellbore; and/or wherein the event is detection of a change in an acoustic environment within the wellbore.

Beneficially, the present techniques provide various enhancements to the hydrocarbon operations. The present techniques may utilize a universal communication configuration to enhance communication. The communication network may be utilized to provide reliable communication in various downhole environments. The present techniques may provide a communication network at lower costs and complexities based on the configuration, which may include using a lesser number of communication nodes for a desired coverage range. These techniques may also facilitate multiple simultaneous conversations in each locality. Further, the present techniques may enhance the hydrocarbon operations by improving data rates and reducing data latency.

Accordingly, the present techniques may be further understood with reference to FIGS. 1 to 9, which are described further below.

FIG. 1 is a schematic representation of a well 100 configured that utilizes a communication network having the proposed configuration of communication nodes. The well 100 includes a wellbore 102 that extends from surface equipment 120 to a subsurface region 128. Wellbore 102 also may be referred to herein as extending between a surface region 126 and subsurface region 128 and/or as extending within a subterranean formation 124 that extends within the subsurface region. The wellbore 102 may include a plurality of tubular sections, which may be formed of carbon steel, such as a casing or liner. Subterranean formation 124 may include hydrocarbons 122. The well 100 may be a hydrocarbon well, a production well, and/or an injection well.

Well 100 also includes an acoustic wireless communication network. The acoustic wireless communication network also may be referred to herein as a downhole acoustic wireless network that includes various communication nodes 114 and a topside communication node and/or control unit 132. The communication nodes 114 may be spaced-apart along a tone transmission medium 130 that extends along a length of wellbore 102. In the context of well 100, tone transmission medium 130 may include a downhole tubular 110 that may extend within wellbore 102, a wellbore fluid 104 that may extend within wellbore 102, a portion of subsurface region 128 that is proximal wellbore 102, a portion of subterranean formation 124 that is proximal wellbore 102, and/or a cement 106 that may extend within wellbore 102 and/or that may extend within an annular region between wellbore 102 and downhole tubular 110. Downhole tubular 110 may define a fluid conduit 108.

To communicate within the wellbore 102 and with the control unit 132, a communication network may be utilized, which may include one or more types of wireless networks, which may include different communication nodes associated with the respective networks. The communication nodes 114 may include low-frequency communication nodes; high-frequency communication nodes; communication nodes configured to communicate with high-frequencies and low-frequencies signals and communication nodes that are configured to communicate with low and/or high frequency radio frequencies (RF). By way of example, each of the communication nodes 114 may include one or more encoding components 116, which may be configured to generate an acoustic tone, such as acoustic tone 112, and/or to induce the acoustic tone within tone transmission medium 130. Communication nodes 114 also may include one or more decoding components 118, which may be configured to receive acoustic tone 112 from the tone transmission medium. A communication node 114 may function as both an encoding component 116 and a decoding component 118 depending upon whether the given node is transmitting an acoustic tone (e.g., functioning as the encoding component) or receiving the acoustic tone (i.e., functioning as the decoding component). The communication nodes 114 may include both encoding and decoding functionality, or structures, with these structures being selectively utilized depending upon whether or not the given communication node is encoding the acoustic tone or decoding the acoustic tone. In addition, the communication nodes 114 may include sensing components that are utilized to measure and monitor conditions within the wellbore 102.

In well 100, transmission of acoustic tone 112 may be along a length of wellbore 102. As such, the transmission of the acoustic tone may be linear, at least substantially linear, and/or directed, such as by tone transmission medium 130. The generated tones or signals propagate both up the conduit (e.g., tubular member), down the conduit and into the surrounding layers, such as cement, casing, liquid inside the casing, and the formation, to varying degrees depending on the acoustic impedance of the material. Such a configuration may be in contrast to more conventional wireless communication methodologies, which generally may transmit a corresponding wireless signal in a plurality of directions, or even in every direction.

The communication nodes 114, which are discussed in more detail herein, are disclosed in the context of well 100, such as a hydrocarbon well. However, it is within the scope of the present disclosure that these methods may be utilized to communicate via an acoustic tones in any suitable acoustic wireless network. As examples, the acoustic wireless network may be used in a subsea well and/or in the context of a subsea tubular that extends within a subsea environment. Under these conditions, the tone transmission medium may include, or be, the subsea tubular and/or a subsea fluid that extends within the subsea environment, proximal to the subsea tubular, and/or within the subsea tubular. As another example, the acoustic wireless network in the context of a surface tubular that extends within the surface region. Under these conditions, the tone transmission medium may include, or be, the surface tubular and/or a fluid that extends within the surface region, proximal to the surface tubular, and/or within the surface tubular.

The plurality of frequencies, which are utilized in the communication nodes 114, may include frequency ranges for a wireless network type. Each of the types of wireless networks may be utilized in different portions of the wellbore to provide the communication for the hydrocarbon operations. The respective frequency ranges may be any suitable values. As examples, each frequency in the plurality of high-frequency ranges may be at least 20 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of high-frequency ranges may be at most 1,000 kHz (1 megahertz (MHz)), at most 800 kHz, at most 750 kHz, at most 600 kHz, at most 500 kHz, at most 400 kHz, at most 200 kHz, at most 150 kHz, at most 100 kHz, and/or at most 80 kHz. Further, each frequency in the low-frequency ranges may be at least 20 hertz (Hz), at least 50 Hz, at least 100 Hz, at least 150 Hz, at least 200 Hz, at least 500 Hz, at least 1 kHz, at least 2 kHz, at least 3 kHz, at least 4 kHz, and/or at least 5 kHz. Additionally or alternatively, each frequency in the high-frequency ranges may be at most 10 kHz, at most 12 kHz, at most 14 kHz, at most 15 kHz, at most 16 kHz, at most 17 kHz, at most 18 kHz, and/or at most 20 kHz.

Figure 2A:
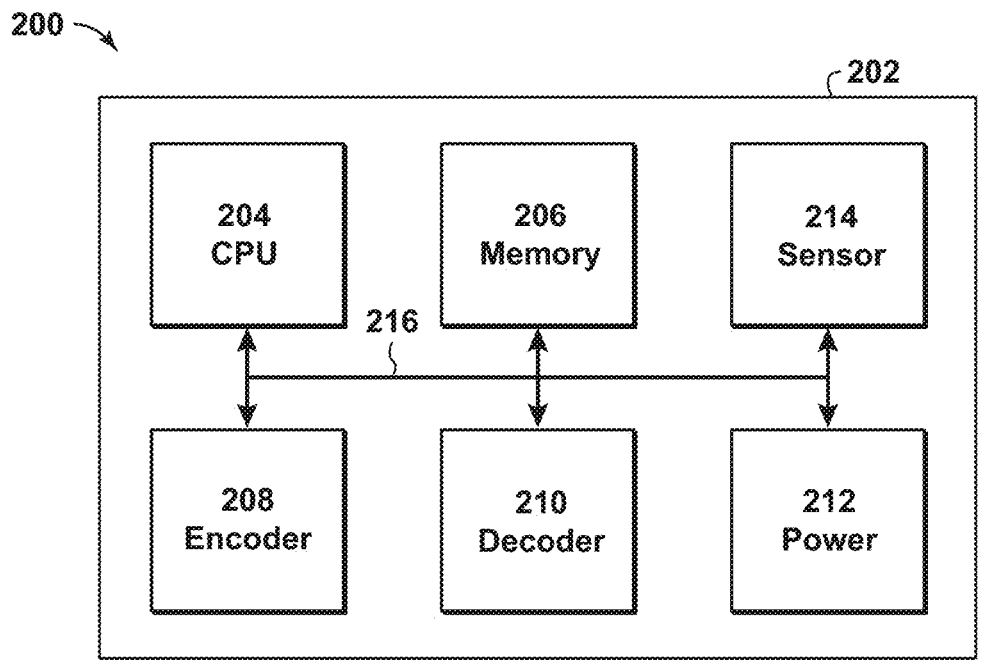
FIGS. 2A and 2B are exemplary views of exemplary communications nodes for use in FIG. 1.
Figure 2B:
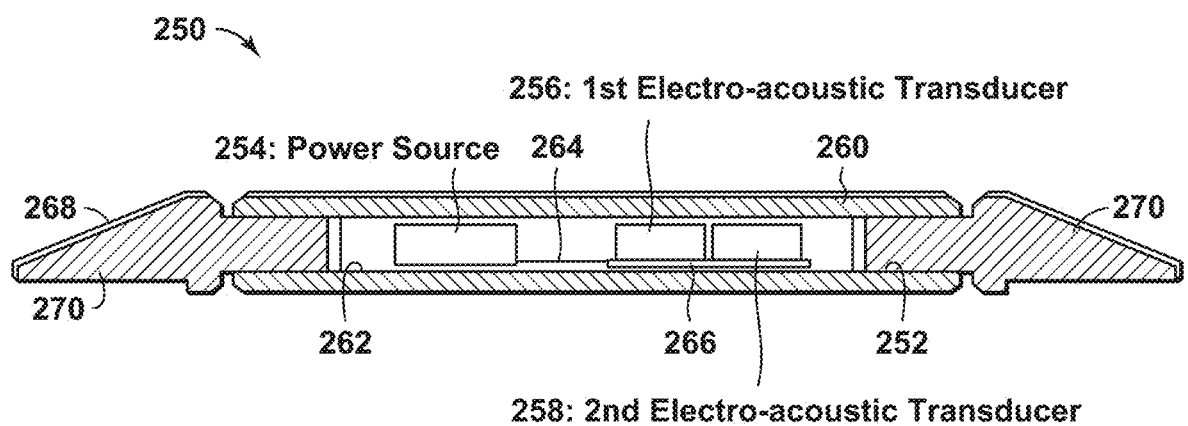

The communication nodes 114 may include various configurations, such as those described in FIGS. 2A and 2B. The communications node may be disposed on a conduit and/or a tubular section within the wellbore. The communication nodes may be associated with equipment, may be associated with tubular members and/or may be associated with the surface equipment. The communication nodes may also be configured to attach at joints, internal surfaces of conduits, surfaces within the wellbore, or to equipment.

As a specific example, the communications nodes may be structured and configured to attach to the surface of conduits at various selected locations. This type of communication node may be disposed in a wellbore environment as an intermediate communications node between the surface and any communication nodes associated with the equipment. The communication nodes may be disposed on each tubular member, or may be disposed on alternative tubular members. By way of example, each of the communications nodes may be welded onto the respective surface or may be secured with a fastener to the tubular member (e.g., may be selectively attachable to or detachable from tubular member). The fastener may include the use of clamps (not shown), an epoxy or other suitable acoustic couplant may be used for chemical bonding. By attaching to the surface of the tubular member, the communication nodes may not interfere with the flow of fluids within the internal bore of the tubular section.

FIG. 2A is a diagram 200 of an exemplary communication node. The communication node 200 may include a housing 202 along with a central processing unit (CPU) 204, memory 206, one or more encoding components 208, one or more decoding components 210, a power component 212 and/or one or more sensing components 214, which communicate via a bus 216. The central processing unit (CPU) 204 may be any general-purpose CPU, although other types of architectures of CPU 204 may be used as long as CPU 204 supports the inventive operations as described herein. The CPU 204 may execute the various logical instructions according to disclosed aspects and methodologies. For example, the CPU 204 may execute machine-level instructions for performing processing according to aspects and methodologies disclosed herein. The CPU 204 may contain two or more microprocessors that operate at a high-frequency effective clock speed and/or at low-frequency effective clock speed. The CPU 204 may be a system on chip (SOC), digital signal processor (DSP), application specific integrated circuits (ASIC), and field programmable gate array (FPGA). The memory 206 may include random access memory (RAM), such as SRAM, DRAM, SDRAM, or the like, read-only memory (ROM), such as PROM, EPROM, EEPROM, or the like, and NAND flash and/or NOR flash. Further, the power component 212 may be disposed in the housing 202 and may be configured to provide power to the other components. The power component 212 may include one or more batteries.

To manage the communications, the communication node 200 may utilize the one or more encoding components 208 and one or more decoding components 210 within the housing 202. The encoding components 208, which may include one or more transducers, may be disposed within the housing 202 and may be configured to generate an acoustic tones and/or to induce the acoustic tone within a tone transmission medium. The one or more decoding components 210, which may include one or more transducers, may be disposed within the housing 202 and may be configured to receive acoustic tones from the tone transmission medium. The encoding and decoding component 208 and 210 may include instructions stored in memory and utilized to perform the generation of the acoustic tones or decoding of the acoustic tones along with compression or decompression of the data packets into the acoustic tones. The encoding component 208 and decoding component 210 may utilize the same transducer in certain configurations.

The one and/or more sensing components 214 may be configured to obtain sensing data and communicate the obtained measurement data to other communication nodes. By way of example, the sensing components 214 may be configured to obtain pressure measurements, temperature measurements, fluid flow measurements, vibration measurements, resistivity measurements, capacitance measurements, strain measurements, acoustics measurements, stimulation and/or hydraulic fracture properties measurements, chemicals measurements, position measurements and other suitable measurements.

In yet another exemplary configuration, FIG. 2B is an exemplary cross sectional diagram of a communications node 250 that may be used in the system. The view of the communication node 250 is along the longitudinal axis. The communications node 250 includes a housing 252, which may be fabricated from carbon steel or other suitable material to avoid corrosion at the coupling. The housing 252 is dimensioned to provide sufficient structural strength to protect internal components and other electronics disposed within the interior region. By way of example, the housing 252 has an outer wall 260, which may be about 0.2 inches (0.51 centimeters (cm)) in thickness. A cavity 262 houses the electronics, including, by way of example and not of limitation, a power source 254 (e.g., one or more batteries), a power supply wire 264, a first electro-acoustic transducer 256, a second electro-acoustic transducer 258, and a circuit board 266. The circuit board 266 may preferably include a micro-processor or electronics module that processes acoustic signals.

For communication between communication nodes, the first electro-acoustic transducer 256 and the second electro-acoustic transducer 258 are provided to convert acoustical energy to electrical energy (or vice-versa) and are coupled with outer wall 260 on the side attached to the tubular member. As an example, the first electro-acoustic transducer 256, which may be configured to receive acoustic signals, and a second electro-acoustic transducer 258, which may be configured to transmit acoustic signals, are disposed in the cavity 262 of the housing 252. The first and second electro-acoustic transducers 256 and 258 provide a mechanism for acoustic signals to be transmitted and received from node-to-node, either up the wellbore or down the wellbore. In certain configurations, the second electro-acoustic transducer 258, configured to serve as a transmitter, of intermediate communications nodes 250 may also produce acoustic telemetry signals. Also, an electrical signal is delivered to the second electro-acoustic transducer 258 via a driver circuit. By way of example, a signal generated in one of the transducer, such as the second electro-acoustic transducer 258, passes through the housing 252 to the tubular member, and propagates along the tubular member to other communications nodes. As a result, the transducers that generates or receives acoustic signals may be a magnetostrictive transducer (e.g., including a coil wrapped around a core) and/or a piezoelectric ceramic transducer. Regardless of the specific type of transducer, the electrically encoded data are transformed into a sonic wave that is carried through the walls of a tubular member in the wellbore.

Further, the communications nodes 250 may include a protective outer layer 268. The protective outer layer 268 resides external to the wall 260 and provides an additional thin layer of protection for the electronics. The intermediate communications nodes 250 may also be fluid sealed with the housing 252 to protect the internal electronics. Additional protection for the internal electronics is available using an optional potting material.

To secure the communication node to the tubular member, the intermediate communications nodes 250 may also optionally include a shoe 270. More specifically, the intermediate communications nodes 250 may include a pair of shoes 270 disposed at opposing ends of the wall 260. Each of the shoes 270 provides a beveled face that helps prevent the node 250 from hanging up on an external tubular body or the surrounding earth formation, as the case may be, during run-in or pull-out. The shoes 270 may also have an optional cushioning material (not shown) under the outer layer 268.

Figure 3A:
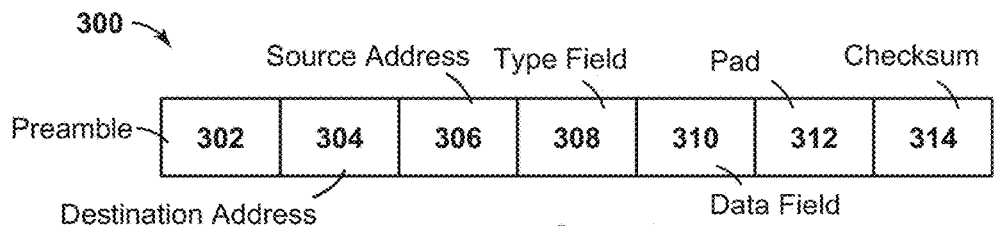
FIGS. 3A, 3B and 3C are exemplary views of exemplary data packets.
Figure 3B:
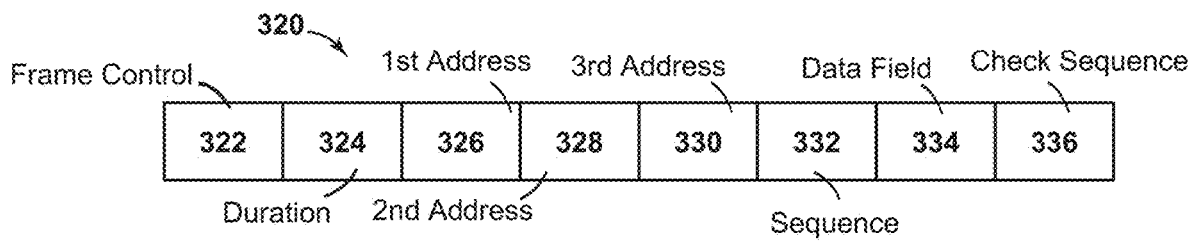
Figure 3C:
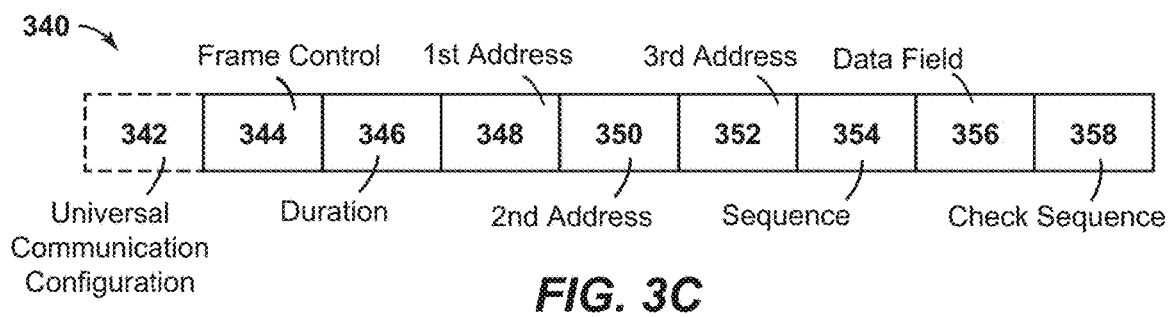

To enhance the performance, the communication nodes may be configured to decoding setting sequence along with an encoded sequence in an initial interval. FIGS. 3A, 3B and 3C are exemplary views of exemplary data packets. The universal communication configuration addresses network communications contrary to conventional teaching for those skilled in the art, which typically involves fixed time slots and/or fixed symbol time. The universal communication configuration specifically provides variable time slots and/or variable symbol times. The time slots is the time to transmit a standard, fixed-length frame, while the frame length is the frame time multiplied by the bit rate. Further, the universal communication configuration does not have to rely upon training, negotiation, or other pre-arrangements with receiving communication node, as the communication settings are provided from the transmitting communication node in the data packet.

By way of example, FIG. 3A is a diagram of an exemplary data packet 300. The data packet 300 may be an Ethernet frame has a frame length that is longer due to the inclusion of additional symbols, but the symbol time remains unchanged. This data packet 300 may be a wired Ethernet (DIX) frame. The data packet 300 may include a preamble in block 302 that is utilized to synchronize the clock in the receiving communication node, but does not convey settings information. The block 304 is a destination address, while the block 306 is a source address. The block 308 is a type field, while block 310 is a data field. Block 312 is a pad, while block 314 is a checksum for at least a portion of the data packet.

FIG. 3B is a diagram of an exemplary data packet 320. The data packet 320 may be a wireless 802.11 data frame. The data packet 320 may include a frame control in block 322. The block 324 is a duration, while the block 326 is a first address, the block 328 is a second address, and the block 330 is a third address. The block 332 is a sequence, while block 334 is a data field and block 336 is a check sequence for at least a portion of the data packet.

FIG. 3C is a diagram of an exemplary data packet 340. The data packet 340 may be a wireless data frame that includes a universal communication configuration at the front of the data packet. The data packet 340 may include a block 342 is a universal communication configuration that provides minimal initial sequence sets of communication setting parameters, while a frame control is in block 344. The block 346 is a duration, while the block 348 is a first address, the block 350 is a second address, and the block 352 is a third address. The block 354 is a sequence, while block 356 is a data field and block 358 is a check sequence for at least a portion of the data packet.

Figure 4:
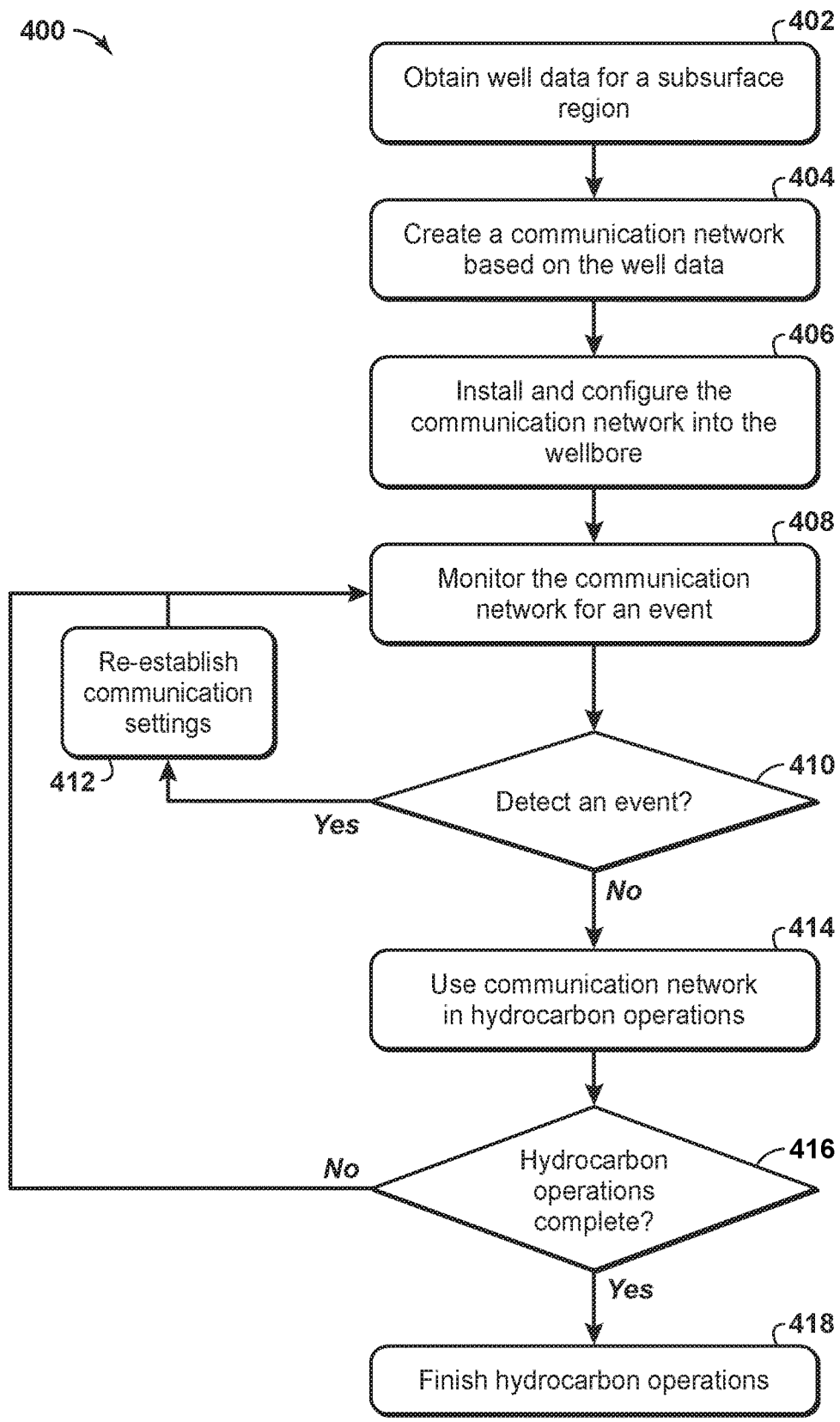
FIG. 4 is an exemplary flow chart in accordance with an embodiment of the present techniques.

FIG. 4 is an exemplary flow chart 400 in accordance with an embodiment of the present techniques. The flow chart 400 is a method for creating, installing and using a wireless communication network for a wellbore. The method may include creating a communication network and install the communication network in a wellbore, as shown in blocks 402 to 406. Then, the communication network may be monitored and hydrocarbon operations are performed, as shown in blocks 408 to 418. The communication nodes may utilize a universal communication configuration to manage the communication settings between communication nodes for the different data packets.

To begin, the method involves creating, installing and using a wireless communication network for a wellbore, as shown in blocks 402 to 406. At block 402, well data is obtained for a subsurface region. The well data may include seismic data, vibration data, acoustic data, electromagnetic data, resistivity data, gravity data, well log data, core sample data, and combinations thereof. Further, the well data may include configuration data regarding the casing, production tubing, cementing within the wellbore and/or other downhole profile data. The well data may be obtained from memory or from the equipment in the wellbore. By way of example, the well data may also include the data associated with the equipment installed within the wellbore and the configuration of the wellbore equipment. For example, the well data may include the dimensions and material composition of the tubular members, the material composition of the cement, length of the tubular members, length of the cement and/or other information associated with the equipment and/or configuration of the well. Further, the well data may also include temperature, pressures, strain and other similar properties. The well data may be obtained from memory or from the equipment in the wellbore. At block 404, a communication network is created based on the well data. The creation of the communication network may include selecting acoustic frequency band and individual frequencies and/or determining the universal communication configuration for the wellbore. Further, based on well data, the communication network may be configured to manage different wireless network types. For example, a communication node may be configured to operate with different wireless network types, such as low frequency, high frequency and/or radio frequency. The creation of the communication network may include performing a simulation with a configuration of communication nodes to test or verify the universal communication configuration, which may include modeling specific frequencies and/or use of certain wireless communication node types within specific zones or segments of the wellbore. The simulation may include modeling the tubular members, the communication of signals between communication nodes and/or other aspects. The simulation results may include the computation of time-varying fluid pressure and fluid compositions and the prediction of signal travel times within the wellbore. Performing the simulation may also include modeling fluid, modeling signal transmissions and/or structural changes based on the communication network. Further, the creation of the network may include determining the universal communication configuration for the communication nodes. Then, the communication network may be configured and installed into the wellbore, as shown in block 406. The installation of the communication network may include disposing the communication nodes within the wellbore, which may be secured to tubular members. They may also be freely dispersed in the annulus. The configuration may include defining universal communication configuration for data exchanges between communication nodes, such as storing a universal communication configuration for the respective communication nodes.

Then, the communication network may be monitored and hydrocarbon operations may be performed, as shown in blocks 408 to 418. At block 408, the communication network is monitored for an event. An event may be when the network fails to operate properly, which may be detected by as a local failure; a change in the acoustic environment; a manual trigger and/or a time based period has been reached. The monitoring of the communication network will determine the status of the communication between respective nodes. At block 410, a determination is made whether an event has been detected. The determination may include determining whether a notification has been indicated. If an event has been detected, the communication settings may be re-established, as shown by block 412. The re-establishment of the communication settings may include performing one or more of the universal communication configurations to re-establish communication between the communication nodes.

If an event is not detected, the communication network is used in hydrocarbon operations, as shown in block 414. The communication network may be used in hydrocarbon operations. The hydrocarbon operations may include hydrocarbon exploration operations, hydrocarbon development operations, collection of wellbore data, and/or hydrocarbon production operations. It may also include the midstream pipelines and storage tanks, or the downstream refinery and distribution operations. For example, the communication network may be used to estimate well performance prediction. As another example, the communication network may be used to adjust hydrocarbon production operations, such as installing or modifying a well or completion, modifying or adjusting drilling operations and/or installing or modifying a production facility. Further, the results may be utilized to predict hydrocarbon accumulation within the subsurface region; to provide an estimated recovery factor; adjust perforation operations and/or to determine rates of fluid flow for a subsurface region. The production facility may include one or more units to process and manage the flow of production fluids, such as hydrocarbons and/or water, from the formation.

Then, at block 416, a determination is made whether the monitoring and communication with hydrocarbon operations are complete. If the monitoring and communication with hydrocarbon operations are not complete, the communication network is continued to be monitored for an event, as shown in block 408. If the monitoring and communication with hydrocarbon operations are complete, the monitoring wellbore data or hydrocarbon operations may be finished, as shown in block 418. The finishing of the monitoring wellbore data or hydrocarbon operations may involve shutting down network telemetry operations, reconfiguring the network for a different activity, and/or continuing to monitor the subsurface region once the operations are complete.

Beneficially, the method provides an enhancement in the production, development, and/or exploration of hydrocarbons. In particular, the method may be utilized to enhance communication within the wellbore by providing a specific configuration that optimizes communication. Further, the enhanced communications may involve less computational effort, may involve less interactive intervention, and/or may be performed in a computationally efficient manner. As a result, this may provide enhancements to production at lower costs and lower risk.

Figure 5:
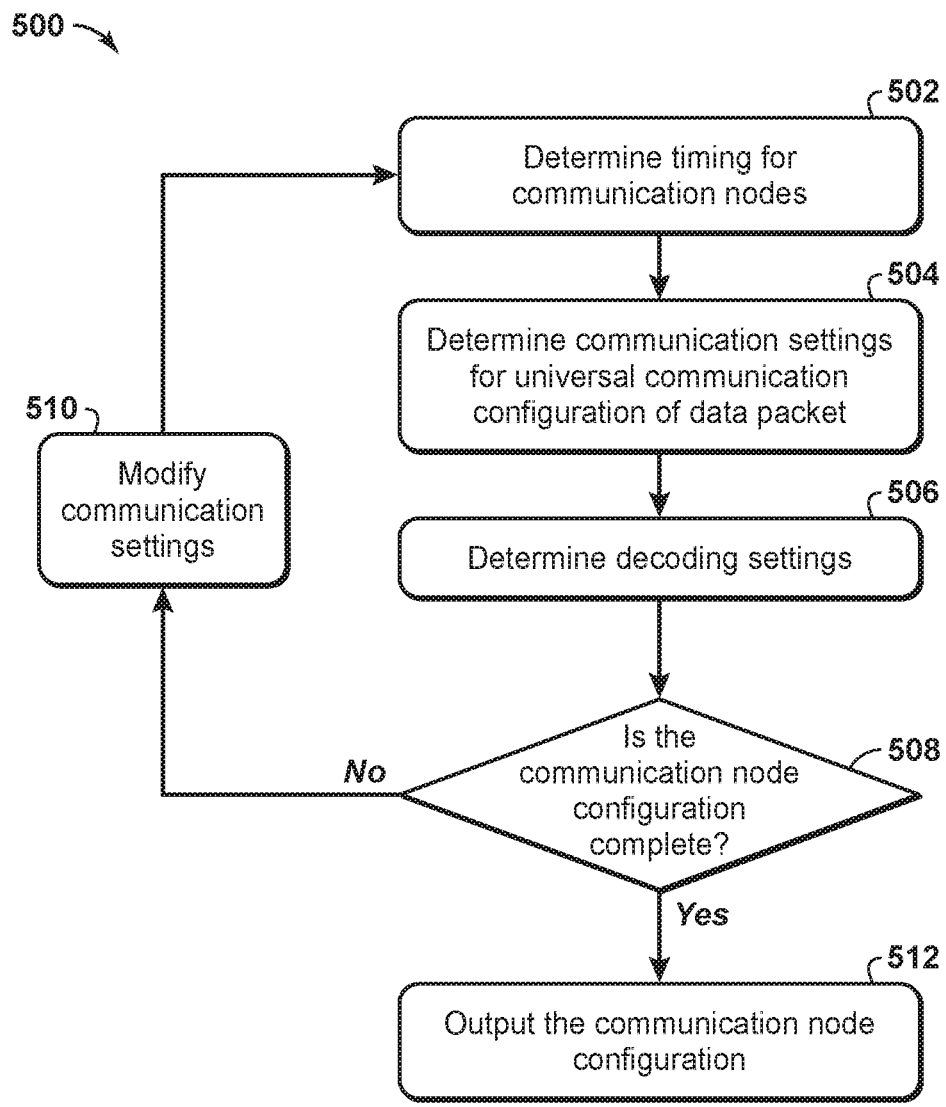
FIG. 5 is an exemplary flow chart in accordance with an embodiment of the present techniques.

As may be appreciated, the blocks of FIG. 4 may be omitted, repeated, performed in a different order, or augmented with additional steps not shown. Some steps may be performed sequentially, while others may be executed simultaneously or concurrently in parallel. For example, in certain embodiments, the communication network created in block 404 and modified in block 412 may involve performing various steps. By way of example, FIG. 5 is an exemplary flow chart 500 in accordance with an embodiment of the present techniques. The flow chart 500 may include performing various steps to create or update the universal communication configuration.

To begin, at block 502, the timing for the communication nodes may be determined. The timing in the communication settings may include determining the interval for initial interval to establish the communication channel between the communication nodes. At block 504, the communication settings for universal communication configuration of data packet are determined. The universal communication configuration may establish conservative communication settings that include determining the signals needed to communicate the decoding settings for the remaining intervals or time slots to the receiving communication node. At block 506, the decoding settings may be determined. The decoding settings may be based on a predetermined table of settings and associated symbols that represent the respective decoding settings, or may be determined based on the monitoring of the wireless network.

At block 508, a determination is made whether the communication node configuration is complete. The determination may include modeling the configuration or testing the configuration. If the communication node configuration is not complete, the communication settings may be modified, as shown in block 510, and various steps may be repeated, such as block 502. If the communication node configuration is complete, the communication node configuration may be outputted, as shown in block 512. The outputting of the communication node configuration may include storing the communication node configuration and/or displaying the communication node configuration.

Figure 6:
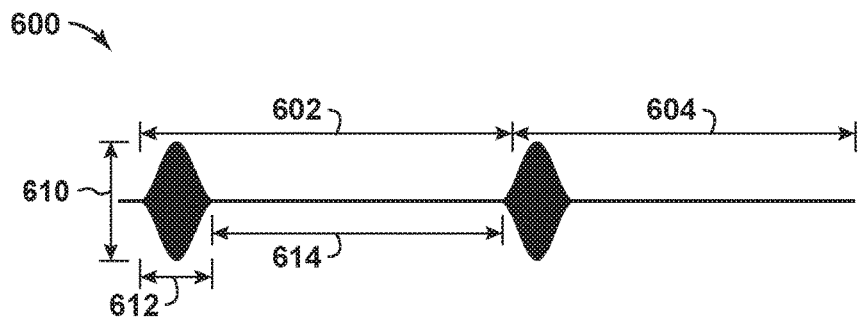
FIG. 6 is an exemplary diagram of an acoustic communication signal used in a system.

By way of example, the network may include transmitting acoustic signals as described further in FIG. 6. For example, FIG. 6 is an exemplary diagram 600 of an acoustic communication signal used in a system. This diagram 600 includes a first tone 602 and a second tone 604, which may be repeated for subsequent tones. In this diagram 600, the symbol time is the period of time from the start of the first tone to the start of the second tone (e.g., the period of time shown as 602). The tones may include various parameters that may be used in the communication network at each communication node. The parameters may include voltage or amplitude 610, tone duration 612, a wait time 614, and frequency which may be a preset configuration. By way of example, the preset configuration may include values may be about 100 volts (V) for voltage or amplitude 610, 10 milliseconds (ms) for tone duration 612 and 30 ms for waiting time 614.

Then, the acoustic communication band optimization may include selecting parameters in each communication node (e.g., voltage or amplitude, tone duration and wait time as defined in FIG. 6). These parameters may be preset. For example, the parameters values may be 100 Volt amplitude, 10 milliseconds (ms) tone duration and 30 ms wait time. The parameters may be in a range between 25 volt amplitude and 200 volt amplitude; in a range between 50 volt amplitude and 150 volt amplitude; or in a range between 75 volt amplitude and 125 volt amplitude. Other parameters may be in a range between 0.5 millisecond (ms) tone duration and 30 ms tone duration; in a range between 5 ms tone duration and 20 ms tone duration; or in a range between 7 ms tone duration and 15 ms tone duration, while the parameters may be in a range between 5 ms wait time and 70 ms wait time; in a range between 10 ms wait time and 50 ms wait time; or in a range between 20 ms wait time and 40 ms wait time.

Figure 7:
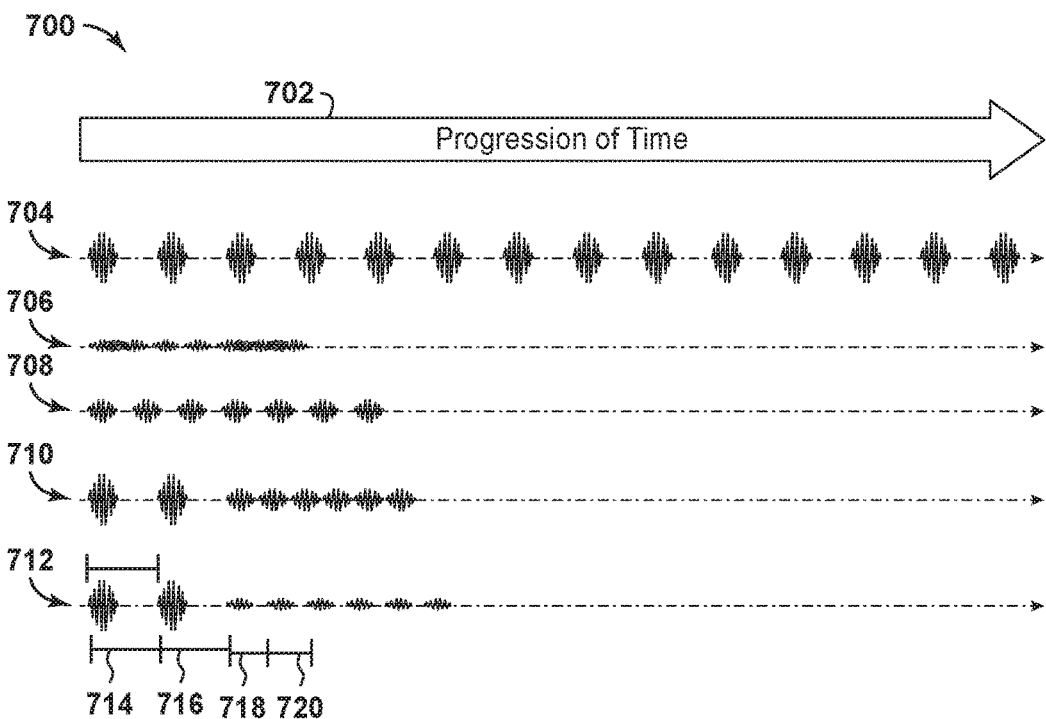
FIG. 7 is an exemplary diagram of various communication configurations.
Figure 8:
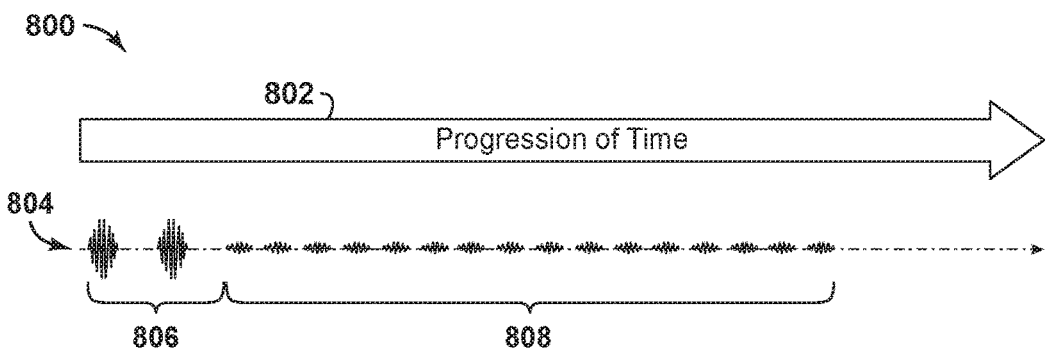
FIG. 8 is an exemplary diagram of a universal communication configuration.
Figure 9:
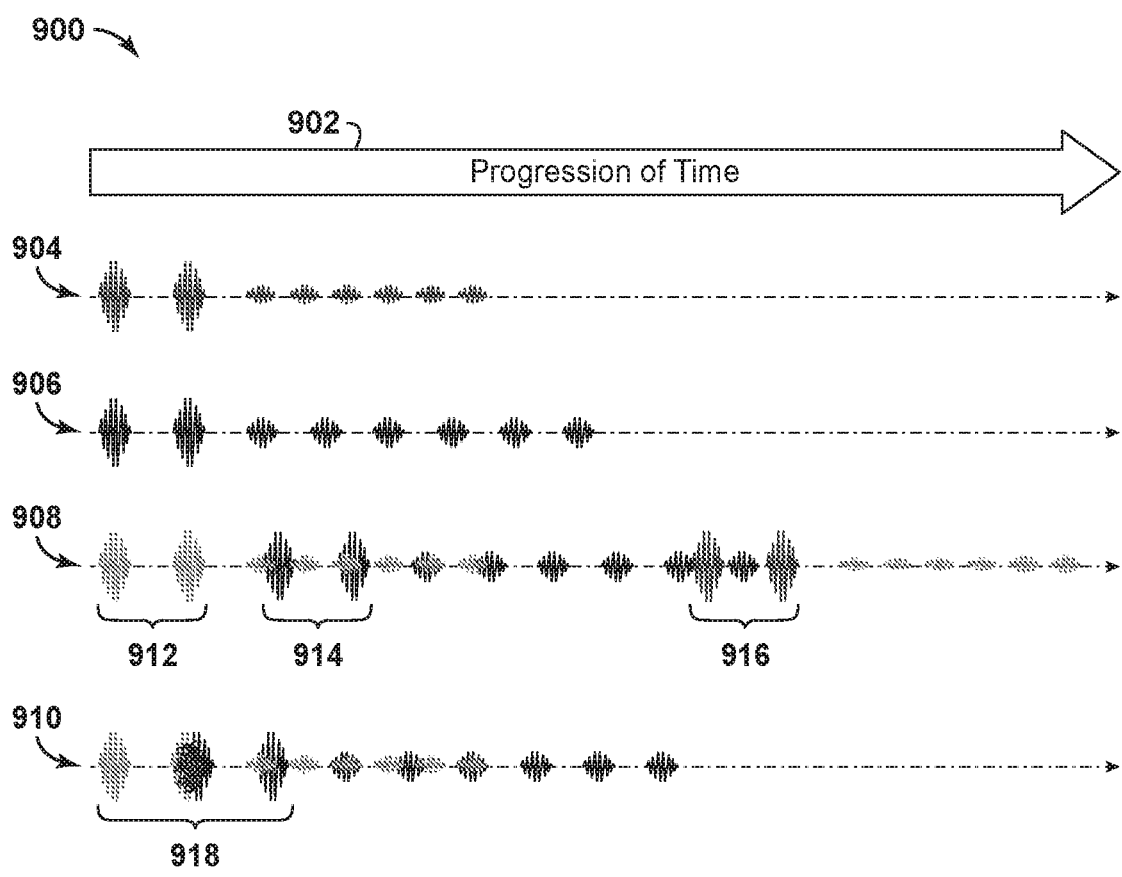
FIG. 9 is an exemplary diagram of universal communication configurations.

By way of example, the communication network may include various communication node configurations as described further in FIGS. 7 to 9. For example, FIG. 7 is an exemplary diagram 700 of various communication configurations. This diagram 700 includes various communication sequences 704, 706, 708, 710 and 712 shown along a time axis 702, which is increasing as shown by the arrow. The first communication sequence 704 is based entirely on extraordinarily conservative settings, which is slow and wastes energy, while the second communication sequence 706 is based entirely on an aggressive setting, which wastes energy if its transmission fails to be received properly and therefore needs to be repeated to complete the communication. The third communication sequence 708 is based entirely on an optimal setting, which may change over time as conditions change or other events occur. The fourth communication sequence 710 is based on a first universal communication configuration setting, while the fifth communication sequence 712 is based on a second universal communication configuration setting, which may be used if the first universal communication configuration setting fails to work properly once the encoded settings are exchanged. Further, the symbol times 714 and 716 are associated with the universal communication settings and are longer than the symbols times 718 and 720, which are associated with the remaining portions of the data packet. Accordingly, the symbol times within the data packet may be different for different portions of data packets.

FIG. 8 is an exemplary diagram 800 of a universal communication configuration. This diagram 800 includes an exemplary universal communication sequences 804 shown along a time axis 802, which is increasing as shown by the arrow. The universal communication sequence 804 is divided into two subsequences. The first sequence 806 is based on extraordinary conservative settings (e.g., decoding setting sequence), while the second sequence 808 is based on an optimal setting (e.g., encoded sequence). The first sequence 806 is utilized to convey the optimal settings or the encoded sequence type of communication.

FIG. 9 is an exemplary diagram 900 of various universal communication configurations. This diagram 900 includes various universal communication sequences 904, 906, 908 and 910 shown along a time axis 902, which is increasing as shown by the arrow. The first communication sequence 904 is based on universal communication settings that involve communicating in the range between 78 kHz and 88 kHz. The second communication sequence 906 is based on universal communication settings that involve communicating in the range between 95 kHz and 105 kHz. The third communication sequence 908 is based on the communication sequences 904 and 906 being communicated along the same locality. In particular, the initial portion 912 of the first communication sequence 904 is shown along the initial portion 914 of the second communication sequence 906 and an additional initial portion 916 of the first communication sequence 904. These communication sequences may be communicated in the same locality without the interference disrupting the communication. However, the fourth communication sequence 910 is based on the communication sequences 904 and 906 being communicated along the same locality. However, as shown in the portion 918, the initial portions of the communication sequences 904 and 906 interfere with each other and disrupt the communication.

In other configurations, the method and system include mechanisms for conserving power in the communication nodes of the acoustic wireless network. The power conservation may include repeatedly and sequentially cycling a given communication node of the plurality of communication nodes for a plurality of cycles by entering a lower power state for a lower power state duration and subsequently transitioning to a listening state for a listening state duration. The low-power state duration is greater than the listening state duration. These methods also include transmitting, during the cycling and via a tone transmission medium, a transmitted acoustic tone for a tone transmission duration, receiving a received acoustic tone, and, responsive to the receiving, interrupting the cycling by transitioning the given communication node to an active state. The tone transmission duration is greater than the low-power state duration such that the acoustic wireless network detects the transmitted acoustic tone regardless of when the transmitting is initiated.

Persons skilled in the technical field will readily recognize that in practical applications of the disclosed methodology, it is partially performed on a computer, typically a suitably programmed digital computer or processor based device. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein. This apparatus, such as the control unit or the communication nodes, may be specially constructed for the required purposes, or it may comprise a general-purpose computer or processor based device selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

By way of example, the control unit may include a computer system that may be used to perform any of the methods disclosed herein. A central processing unit (CPU) is coupled to system bus. The CPU may be any general-purpose CPU, although other types of architectures of CPU (or other components of exemplary system) may be used as long as CPU (and other components of system) supports the inventive operations as described herein. The CPU may contain two or more microprocessors that operate at a high-frequency effective clock speed and/or at low-frequency effective clock speed. The CPU may be a system on chip (SOC), digital signal processor (DSP), application specific integrated circuits (ASIC), and field programmable gate array (FPGA). The CPU may execute the various logical instructions according to disclosed aspects and methodologies. For example, the CPU may execute machine-level instructions for performing processing according to aspects and methodologies disclosed herein.

The computer system may also include computer components such as a random access memory (RAM), which may be SRAM, DRAM, SDRAM, or the like. The computer system may also include read-only memory (ROM), which may be PROM, EPROM, EEPROM, NAND flash, NOR flash, or the like. RAM and ROM hold user and system data and programs, as is known in the art. The computer system may also include an input/output (I/O) adapter, a graphical processing unit (GPU), a communications adapter, a user interface adapter, and a display adapter. The I/O adapter, the user interface adapter, and/or communications adapter may, in certain aspects and techniques, enable a user to interact with computer system to input information.

The I/O adapter preferably connects a storage device(s), such as one or more of hard drive, compact disc (CD) drive, floppy disk drive, tape drive, etc. to computer system. The storage device(s) may be used when RAM is insufficient for the memory requirements associated with storing data for operations of embodiments of the present techniques. The data storage of the computer system may be used for storing information and/or other data used or generated as disclosed herein. The communications adapter may couple the computer system to a network (not shown), which may include the communication network for the wellbore and a separate network to communicate with remote locations), which may enable information to be input to and/or output from system via the network (for example, a wide-area network, a local-area network, a wireless network, any combination of the foregoing). User interface adapter couples user input devices, such as a keyboard, a pointing device, and the like, to computer system. The display adapter is driven by the CPU or GPU to control, through a display driver, the display on a display device.

The architecture of system may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to: communicate data among a plurality of communication nodes within a wellbore. Each of the communication nodes are configured to have a universal communication configuration based on the communication network, wherein the universal communication configuration comprises a decoding setting in an interval that establishes a decoding setting for remaining intervals to adjust the communication settings in a receiving communication node based on the decoding setting.

In one or more configurations, the communication nodes may be configured to provide various enhancements. The communication nodes may be configured to exchange low-frequency signals are less than or equal to ($\leq$) 20 kilohertz or in the range between 100 hertz and 20 kilohertz; to exchange high-frequency signals that are greater than ($>$) 20 kilohertz or in the range between greater than 20 kilohertz and 1 megahertz; and/or to: i) monitor the wireless network for an event, ii) modify the settings in one or more of the plurality of communication nodes if an event is detected, iii) continue the communications if an event is not detected, and iv) repeat steps i) to iii) until the hydrocarbon operations are complete.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method of communicating data among a plurality of communication nodes in a communication network associated with a system the method comprising:
   configuring each of the plurality of communication nodes in the communication network to transmit a first universal communication configuration in a portion of a data packet, wherein the first universal communication configuration comprises a first decoding setting that establishes a communication setting to decode one or more remaining portions of the data packet;
associating the plurality of communication nodes with the system;
communicating between the plurality of communication nodes; and
performing operations in the system based on an exchange of data packets between the plurality of communication nodes;
the method further comprising:
i) monitoring the communication network for an event in a wellbore during hydrocarbon operations, wherein the event is detection, by a transmitting node, of a change in an acoustic environment within the wellbore;
ii) modifying settings in one or more of the plurality of communication nodes to use a second universal communication configuration if the event is detected, wherein the second universal communication configuration comprises a second decoding setting that establishes a second communication setting to decode the one or more remaining portions of the data packet;
iii) continuing the exchange of data packets between the plurality of communication nodes using the first universal communication configuration if an event is not detected; and
iv) repeating steps i) to iii) until the hydrocarbon operations are complete wherein the first universal communication configuration and the second universal communication configuration provide a dynamic mechanism that dynamically changes communication settings based on a decoding setting of each data packet.

2. The method of claim 1, further comprising configuring each of the plurality of communication nodes in the communication network to receive the first decoding setting from the portion of the data packet; and to decode the one or more remaining portions of the data packet based on the first decoding setting.

3. The method of claim 1, wherein two or more of the plurality of communication nodes are configured to exchange data packets via an acoustic wireless connection.

4. The method of claim 1, wherein each of the plurality of communication nodes may be configured to have different tone durations for the first universal communication configuration portion of the data packet and the one or more remaining portions of the data packet.

5. The method of claim 1, wherein each of the plurality of communication nodes is configured to transmit the first universal communication configuration using a tone duration less than 10 millisecond.

6. The method of claim 1, wherein each of the plurality of communication nodes is configured to transmit the first universal communication configuration for a tone duration in a range between 1 millisecond and 1 second.

7. The method of claim 1, wherein each of the plurality of communication nodes is configured to transmit the first universal communication configuration for a tone duration in a range between 2 milliseconds and 20 milliseconds.

8. The method of claim 1, wherein each of the plurality of communication nodes is configured to have different voltage amplitudes for the first universal communication configuration portion of the data packet and the remaining portion of the data packet.

9. The method of claim 1, wherein each of the plurality of communication nodes is configured to transmit the first universal communication configuration at a communication setting that has a voltage amplitude of two or more times a voltage amplitude of a communication setting for the one or more remaining portions of the data packet.

10. The method of claim 1, wherein each of the plurality of communication nodes is configured to transmit the first universal communication configuration at a communication setting that has a voltage amplitude of four or more times a voltage amplitude of a communication setting for the one or more remaining portions of the data packet.

11. The method of claim 1, wherein each of the plurality of communication nodes is configured to have different tone amplitudes for the first universal communication configuration portion of the data packet and the one or more remaining portions of the data packet.

12. The method of claim 1, wherein each of the plurality of communication nodes is configured to transmit the first universal communication configuration at a communication setting that has a tone amplitude of two or more times a tone amplitude of a communication setting for the one or more remaining portions of the data packet.

13. The method of claim 1, wherein each of the plurality of communication nodes is configured to transmit the first universal communication configuration at a communication setting that has a tone amplitude of four or more times a tone amplitude of a communication setting for the one or more remaining portions of the data packet.

14. The method of claim 1, wherein each of the plurality of communication nodes is configured to have different symbol times for the first universal communication configuration portion of the data packet and the one or more remaining portions of the data packet.

15. The method of claim 1, wherein each of the plurality of communication nodes is configured to transmit the first universal communication configuration at a communication setting that has a symbol time at least two milliseconds greater than a symbol time of a communication setting for the one or more remaining portions of the data packet.

16. The method of claim 1, wherein each of the plurality of communication nodes is configured to transmit the first universal communication configuration at a communication setting that has a symbol time at least 10% greater than a symbol time of a communication setting for the one or more remaining portions of the data packet.

17. The method of claim 1, wherein the first universal communication configuration portion of the data packet is an initial portion of the data packet.

18. The method of claim 1, further comprising configuring each of the plurality of communication nodes in the communication network to transmit a third universal communication configuration in a third portion of a data packet, wherein the third universal communication configuration comprises a third decoding setting that establishes a third communication setting to decode the one or more remaining portions of the data packet.

19. The method of claim 1, wherein the first universal communication configuration may be dynamically adjusted in the exchange of data packets between the plurality of communication nodes.

20. The method of claim 1, further comprising disposing the plurality of communication nodes and one or more tubular members within the wellbore.

21. The method of claim 1, further comprising disposing the plurality of communication nodes and one or more tubular members along a subsea conduit.

22. The method of claim 1, further comprising disposing the plurality of communication nodes and one or more tubular members along a pipeline.

23. The method of claim 1, further comprising disposing the plurality of communication nodes and one or more tubular members along a drilling string.

24. The method of claim 1, wherein the first universal communication configuration further comprises an error correction setting for detecting any errors in the data packet.

25. The method of claim 1, further comprising:
determining the first universal communication configuration;
obtaining well data for a subsurface region; and
creating the communication network based on the well data; wherein the communication network comprises the plurality of communication nodes disposed within the wellbore.

26. The method of claim 1, wherein the communicating between the plurality of communication nodes comprises exchanging low-frequency signals are less than or equal to (≤) 20 kilohertz.

27. The method of claim 1, wherein the communicating between the plurality of communication nodes comprises exchanging low-frequency signals that are in a range between 100 hertz and 20 kilohertz.

28. The method of claim 1, wherein the communicating between the plurality of communication nodes comprises exchanging high-frequency signals that are greater than (>) 20 kilohertz.

29. The method of claim 1, wherein the communicating between the plurality of communication nodes within the wellbore to perform hydrocarbon operations comprises exchanging high-frequency signals that are in a range between 20 kilohertz and 1 megahertz.

30. The method of claim 1, wherein a first set of the plurality of communication nodes are disposed in unmonitored sections of the wellbore and a second set of the plurality of communication nodes are disposed in monitored sections of the wellbore.

31. The method of claim 1, wherein the event is a failure of the communication network to operate properly within the wellbore.

32. The method of claim 1, wherein communicating between the plurality of communication nodes comprises performing simultaneous data packet exchanges between two or more of the plurality of communication nodes.

33. The method of claim 1, wherein the communication nodes comprise sensing components that are utilized to measure and monitor conditions within the wellbore to adjust the communication settings.

* * * * *